(12) United States Patent
Veasy et al.

(10) Patent No.: US 12,188,206 B2
(45) Date of Patent: *Jan. 7, 2025

(54) VEHICLE AUTO TURNING CONTROL SYSTEM

(71) Applicant: DEERE & COMPANY, Moline, IL (US)

(72) Inventors: David A Veasy, Dubuque, IA (US); Nathan J. Horstman, Durango, IA (US); Craig Christofferson, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,580

(22) Filed: Dec. 18, 2023

(65) Prior Publication Data

US 2024/0117599 A1    Apr. 11, 2024

Related U.S. Application Data

(62) Division of application No. 16/413,814, filed on May 16, 2019, now Pat. No. 11,891,778.

(Continued)

(51) Int. Cl.
*B62D 9/00* (2006.01)
*B62D 1/12* (2006.01)
(Continued)

(52) U.S. Cl.
CPC .............. *E02F 9/2087* (2013.01); *B62D 1/12* (2013.01); *B62D 6/002* (2013.01); *B62D 6/007* (2013.01);
(Continued)

(58) Field of Classification Search
CPC ..... E02F 9/2087; E02F 9/0841; E02F 9/2004; E02F 3/841; B62D 1/12; B62D 6/002;
(Continued)

(56) References Cited

U.S. PATENT DOCUMENTS 4,802,545 A * 2/1989 Nystuen ................. B62D 12/00
                                                              180/419
5,375,059 A * 12/1994 Kyrtsos ................... G01S 19/11
                                                              701/470
(Continued)

FOREIGN PATENT DOCUMENTS

CA        2288442 C       12/2007
WO    WO 2014025782 A1    2/2014
(Continued)

*Primary Examiner* — Edwin J Toledo-Duran

(57) ABSTRACT

The present disclosure provides methods for adjusting steering angle and articulation angle in an auto steering operation of a work vehicle. The percentage of travel of an articulation joystick of the work vehicle at least partially determines an articulation desired angle change, which can be used to calculate an articulation desired angle and a steering desired angle change. The difference between the articulation desired angle and an articulation angle detected by an articulation angle sensor is used to adjust the articulation angle. The steering desired angle change can be used to calculate a steering desired angle. The difference between the steering desired angle and a steering angle detected by a steering angle sensor is used to adjust the steering angle.

10 Claims, 17 Drawing Sheets

Related U.S. Application Data

(60) Provisional application No. 62/719,409, filed on Aug. 17, 2018.

(51) Int. Cl.
| | | |
|---|---|---|
| *B62D 6/00* | (2006.01) | |
| *B62D 7/15* | (2006.01) | |
| *B62D 12/00* | (2006.01) | |
| *B62D 15/02* | (2006.01) | |
| *E02F 9/08* | (2006.01) | |
| *E02F 9/20* | (2006.01) | |
| *E02F 3/84* | (2006.01) | |

(52) U.S. Cl.
CPC ............... *B62D 7/15* (2013.01); *B62D 12/00* (2013.01); *B62D 15/021* (2013.01); *B62D 15/025* (2013.01); *E02F 9/0841* (2013.01); *E02F 9/2004* (2013.01); *B60Y 2200/20* (2013.01); *E02F 3/841* (2013.01)

(58) Field of Classification Search
CPC .......... B62D 6/007; B62D 7/15; B62D 12/00; B62D 15/021; B62D 15/025; B62D 9/00; B60Y 2200/20; G05B 19/04
See application file for complete search history.

(56) References Cited

U.S. PATENT DOCUMENTS

| | | | |
|---|---|---|---|
| 6,152,237 A | 11/2000 | Hartman et al. | |
| 7,325,636 B2* | 2/2008 | Yeoman | E02F 3/7663 |
| | | | 180/419 |
| 8,548,680 B2* | 10/2013 | Ryerson | E02F 9/264 |
| | | | 701/41 |
| 8,807,261 B2 | 8/2014 | Subrt et al. | |
| 9,051,711 B2 | 6/2015 | Sharma et al. | |
| 9,103,098 B2* | 8/2015 | Zhu | E02F 9/2087 |
| 9,234,331 B1* | 1/2016 | Sharma | E02F 9/0841 |
| 9,428,884 B2 | 8/2016 | Sharma et al. | |
| 11,820,370 B2* | 11/2023 | Strecker | B60W 40/10 |
| 2014/0326471 A1 | 11/2014 | Zhu et al. | |
| 2015/0259882 A1* | 9/2015 | Sharma | E02F 9/225 |
| | | | 701/41 |
| 2015/0259883 A1* | 9/2015 | Sharma | E02F 9/0841 |
| | | | 701/41 |
| 2018/0118256 A1* | 5/2018 | Ge | B62D 12/00 |

FOREIGN PATENT DOCUMENTS

| | | |
|---|---|---|
| WO | WO 2015142452 A1 | 9/2015 |
| WO | WO 2015142534 A1 | 9/2015 |

* cited by examiner

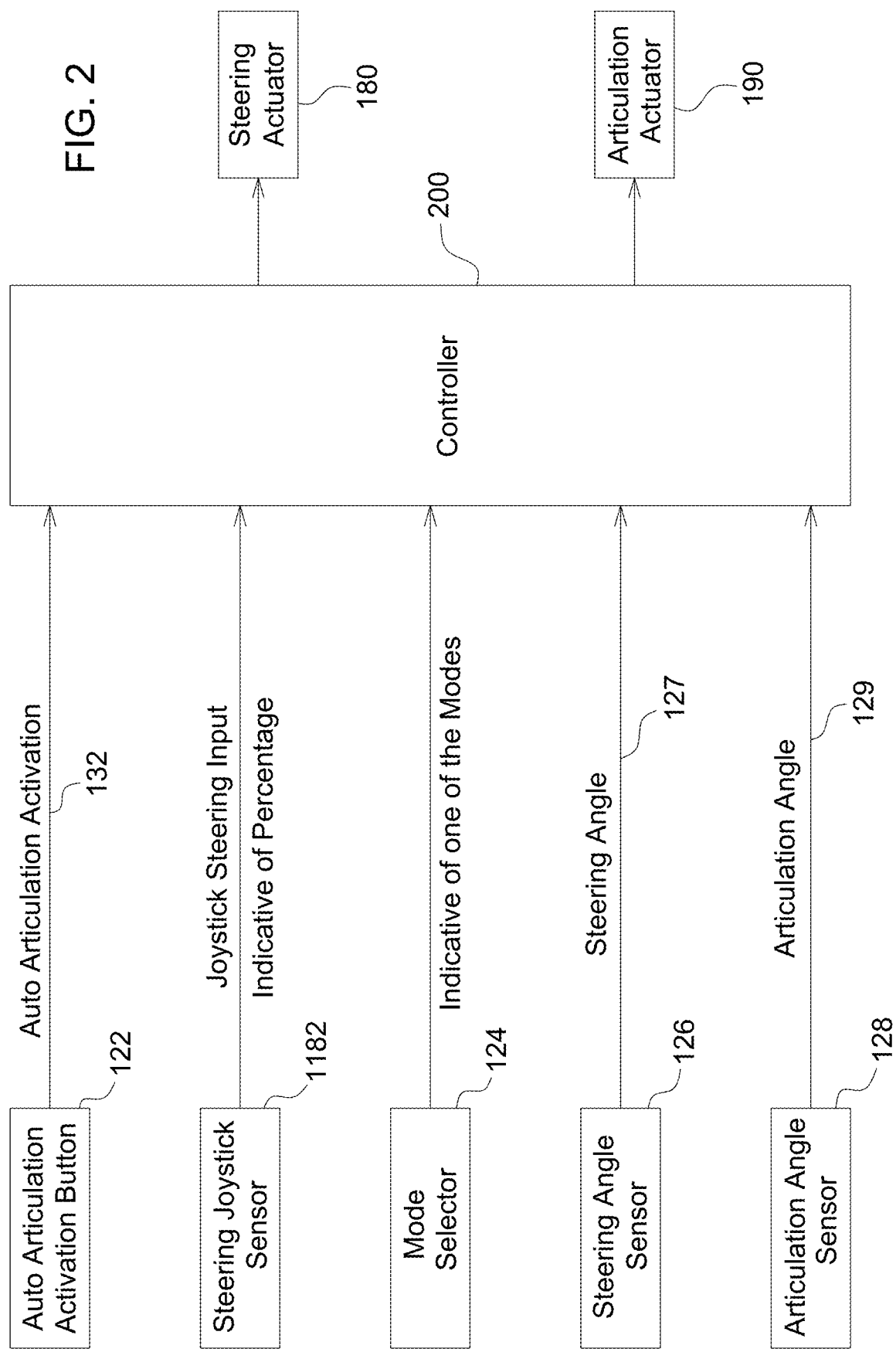

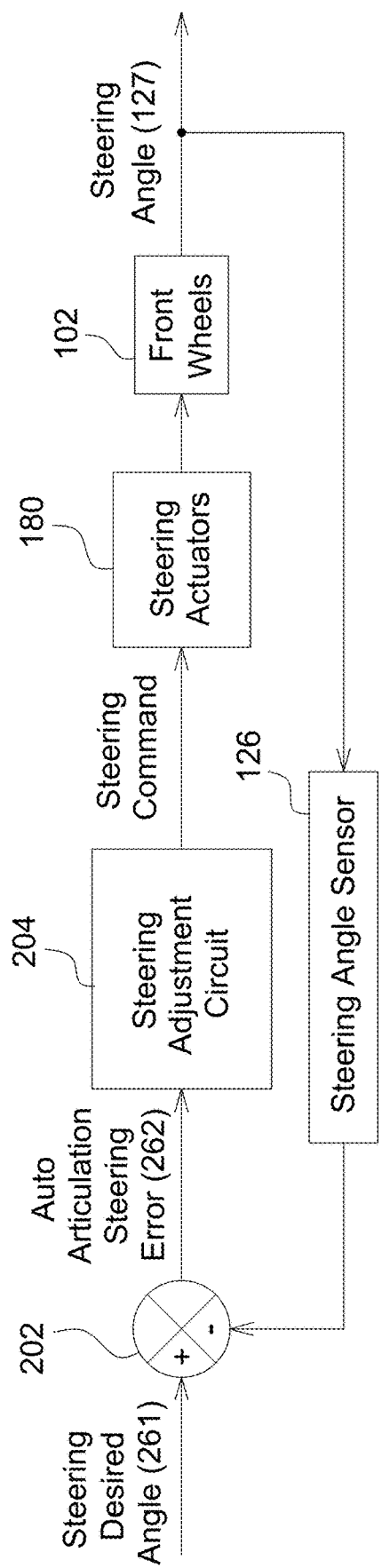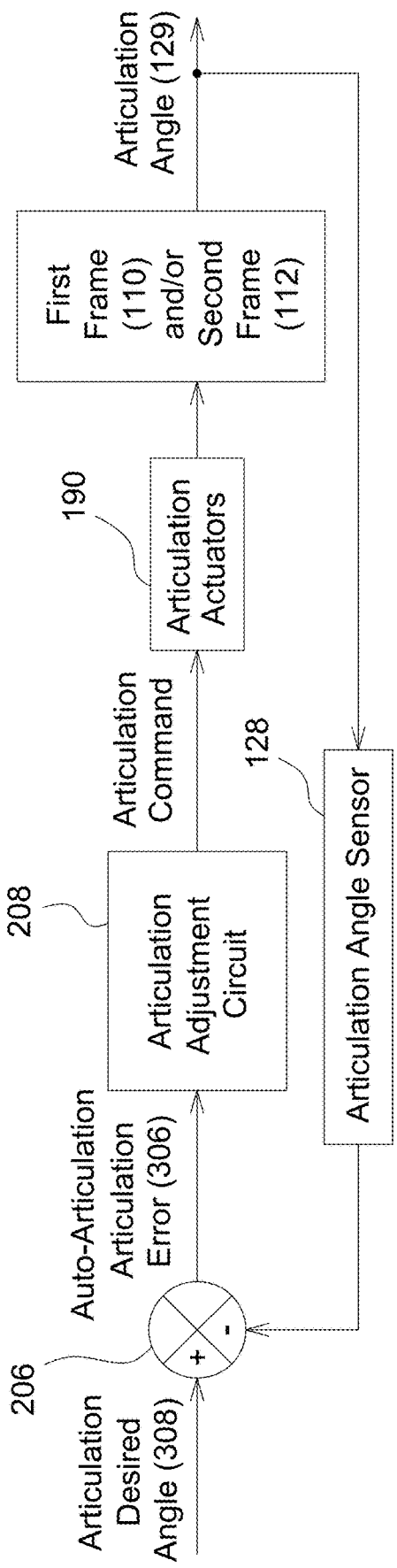

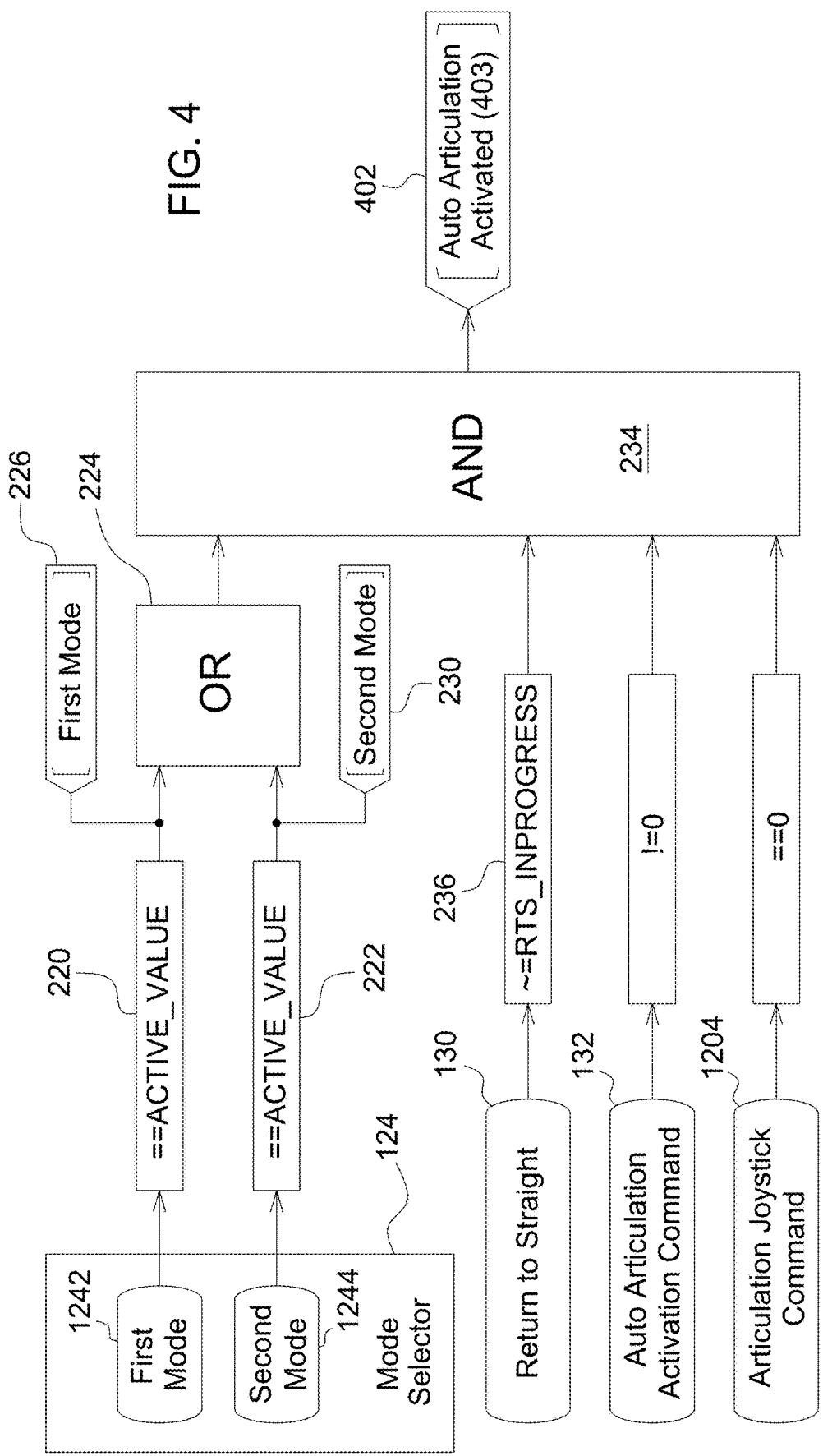

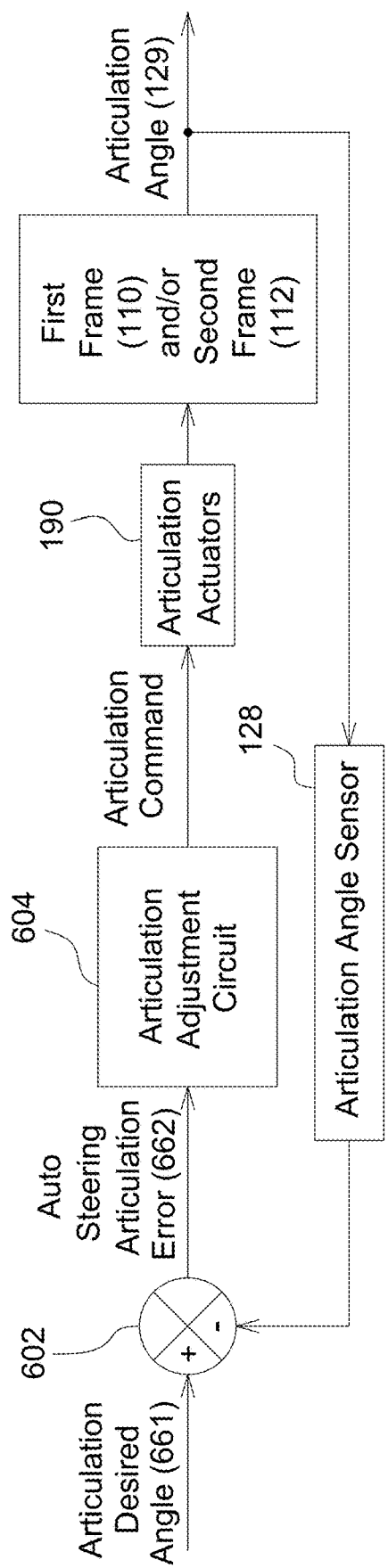
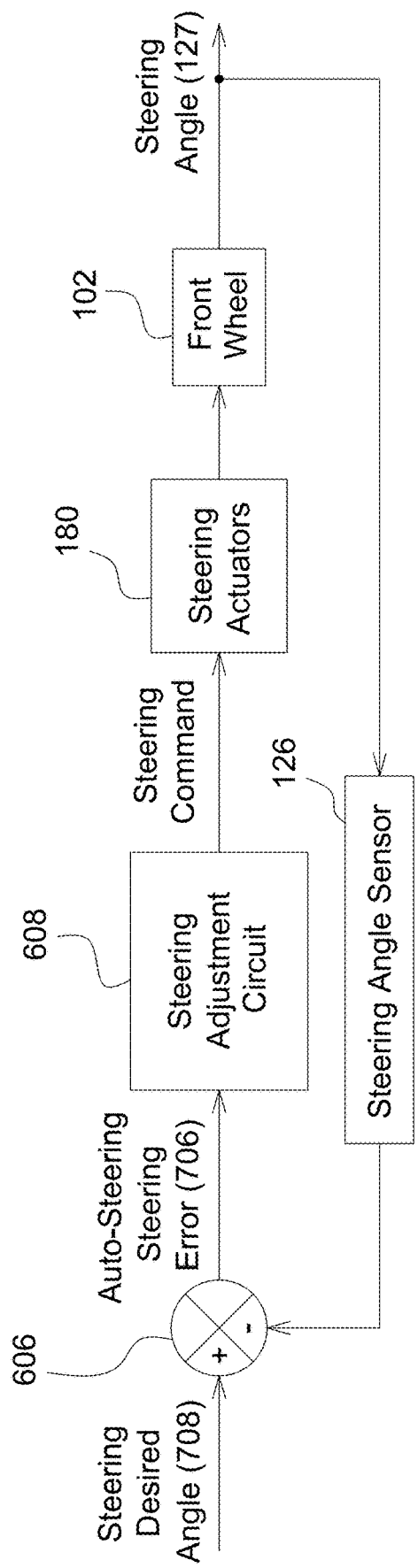
FIG. 9A
FIG. 9B

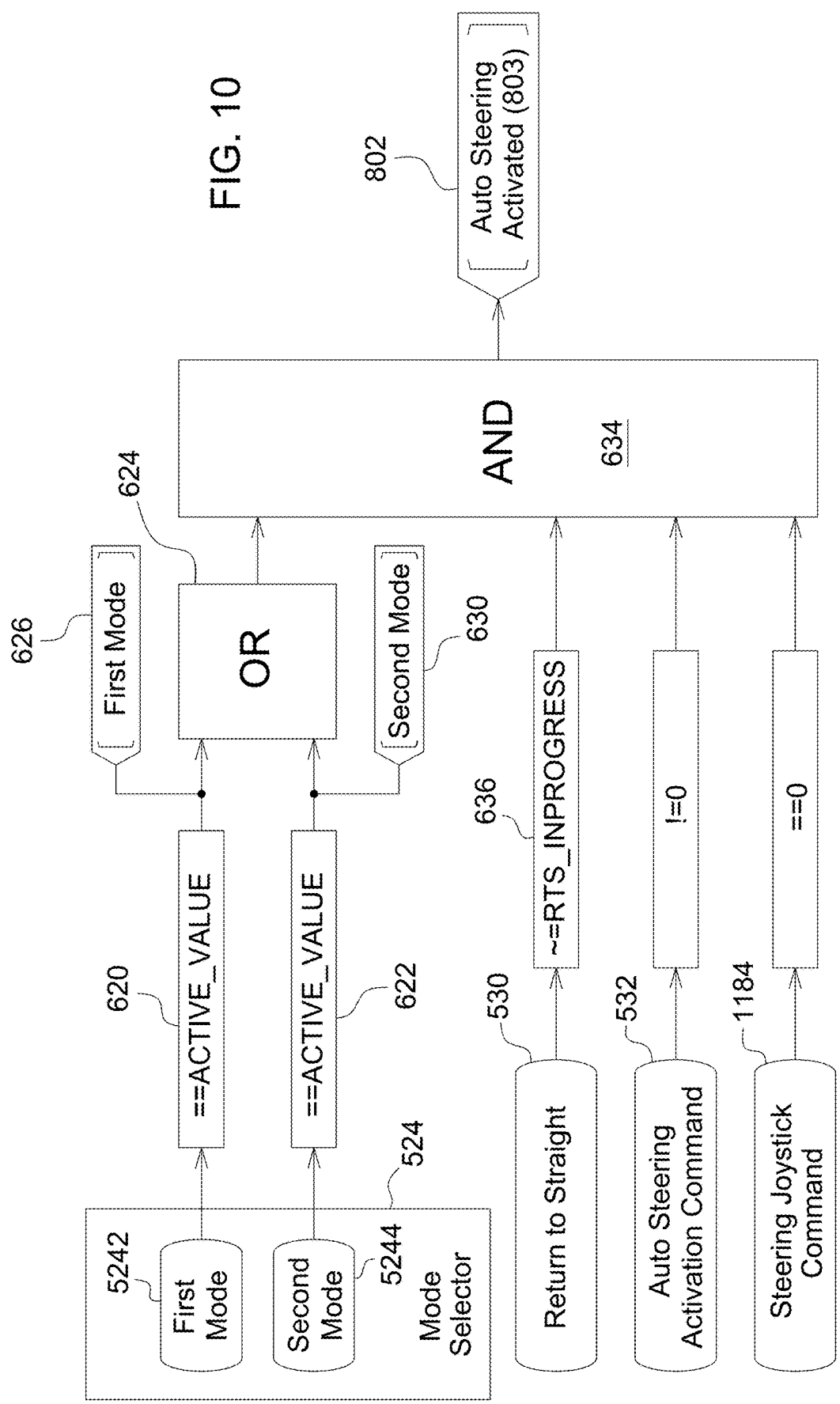

VEHICLE AUTO TURNING CONTROL SYSTEM

RELATED APPLICATIONS

This application is a divisional application of U.S. application Ser. No. 16/413,814, titled Vehicle Auto Turning Control System, filed on May 16, 2019, which claims priority to U.S. Application No. 62/719,409, titled Vehicle Auto Turning Control System, filed on Aug. 17, 2018, which is hereby incorporated by reference in its entirety.

FIELD OF THE DISCLOSURE

The present disclosure relates generally to a work vehicle that has at least two pivot axes around which different portions of the vehicle can turn at different angles.

BACKGROUND OF THE DISCLOSURE

In some vehicles, they have multiple segments of frames pivotally coupled one after another in aft-and-fore direction. One example for those vehicles is a motor grader. In the front of the first frame includes ground engaging apparatus such as front wheels. The second frame is pivotally connected to the first frame. In general, an operator uses a steering joystick to control a steering angle of the front wheels and an articulation joystick to control an articulation angle between the first and second from of the motor grader.

SUMMARY OF THE DISCLOSURE

According to an aspect of the present disclosure, a method for adjusting articulation angle in an auto steering operation of a work vehicle may include receiving a signal indicative of a percentage of a travel of an articulation joystick; calculating an articulation desired angle change partially based on the percentage of travel of the articulation joystick; adding the articulation desired angle change to an articulation last desired angle which was a previous articulation desired angle to obtain an articulation desired angle; calculating a difference between an articulation angle detected by an articulation angle sensor and the articulation desired angle to obtain an auto steering articulation error; and adjusting the articulation angle by an articulation actuator based on the auto steering articulation error.

According to an aspect of the present disclosure, a method for adjusting steering angle in an auto steering operation of a work vehicle may include calculating a steering desired angle change via the articulation desired angle change divided by the auto steering articulation ratio, the articulation desired angle change at least based on a percentage of a travel of an articulation joystick; adding the steering desired angle change to a steering last desired angle which was a previous steering desired angle; calculating a difference between a steering angle detected by a steering angle sensor and the steering desired angle to obtain an auto-steering steering error; and adjusting the steering angle by a steering actuator based on the auto-steering steering error.

According to an aspect of the present disclosure, a method for activating auto steering of a work vehicle may include providing a signal indicative of an auto steering activation command received by a controller; ensuring a return to straight program is not performed based on a signal indicative of a return to straight command having a false value; ensuring a steering joystick is not moved based on a signal indicative of an articulation joystick command having a false value; and activating auto steering based on the signal indicative of the auto steering activation command, the signal indicative of the return to straight command, and the signal indicative of the steering joystick command.

According to an aspect of the present disclosure, an auto steering system of a work vehicle may include a body, a ground engaging apparatus, an articulation joystick, and at least one controller. The body has a first frame and a second frame configured to articulate relative to one another by an articulation actuator. The ground engaging apparatus is coupled to the body and is configured to steer relative to the body by a steering actuator. The articulation joystick is coupled to the body. The controller is configured to: receive a signal indicative of a percentage of a travel of the articulation joystick; calculate an articulation desired angle change partially based on the percentage of travel of the articulation joystick; add the articulation desired angle change to an articulation last desired angle which was a previous articulation desired angle to obtain an articulation desired angle; calculate a steering desired angle change via the articulation desired angle change divided by the auto steering articulation ratio; add the steering desired angle change to a steering last desired angle which was a previous steering desired angle; calculate a difference between a steering angle detected by a steering angle sensor and the steering desired angle to obtain an auto-steering steering error; and adjust the steering angle by transmitting a signal indicative of a steering command to the steering actuator based on the auto-steering steering error.

Other features and aspects will become apparent by consideration of the detailed description and accompanying drawings.

BRIEF DESCRIPTION OF THE DRAWINGS

The detailed description of the drawings refers to the accompanying figures in which:

FIG. 2 is a diagrammatic view demonstrating a controller of the motor grader receiving signals from and transmitting signals to multiple elements in the motor grader;

FIG. 3A is a block diagram demonstrating a closed loop steering control;

FIG. 3B is a block diagram demonstrating a closed loop articulation control;

FIG. 4 is a block diagram demonstrating how auto articulation is activated;

FIG. 9A is a block diagram demonstrating a closed loop articulation control;

FIG. 9B is a block diagram demonstrating a closed loop steering control;

FIG. 10 is a block diagram demonstrating how auto steering is activated;

DETAILED DESCRIPTION OF THE DRAWINGS

Figure 1:
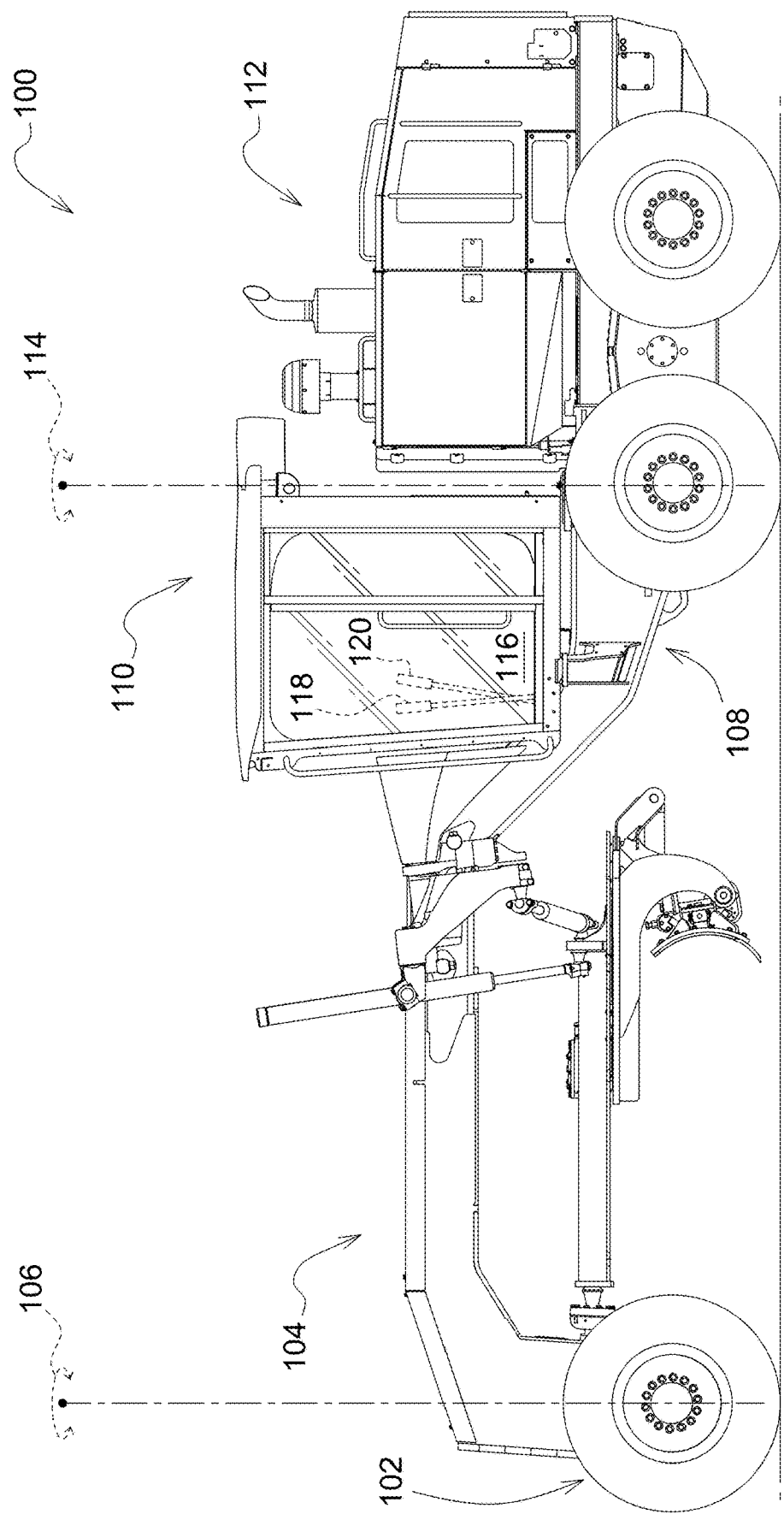
FIG. 1 is a side view of a motor grader.

The present disclosure relates generally to a work vehicle that has at least two axes around which different portions of the vehicle can turn at different angles. In the following description, a motor grader is used for illustration purposes. However, the work vehicle may also include other types of vehicles having at least a steering axis and an articulation axis, such as dump truck. The present disclosure may also relate to a transportation vehicle if it has at least a steering axis and an articulation axis. The present disclosure includes a vehicle auto turning control system. In the following embodiments, the vehicle auto turning control system is a subsystem built on a command based (velocity based) turning control system.

A position based turning control system is a system for turning a vehicle at an angle based on the relevant position of a steering wheel(s) or a joystick(s). The joystick is used for illustration purposes. If the joystick travels right, 20% of its maximum range, commanding turning right, the wheels, normally front wheels, will turn right 20% of their maximum steering angle. If the user intends to get the front wheels back straight, the user moves the joystick left to the middle position.

The command based (velocity based) turning control system is substantially different from the position based turning control system. The command based turning control system is a system for turning a vehicle at an angular velocity based on the relevant position of a steering wheel(s) or a joystick(s). The joystick is used for illustration purposes. If the joystick travels right, 20% of its maximum range, commanding turning right, the wheels, normally front wheels, will turn right at an angular velocity of 20% of the full angular velocity. Then if the user intends to get the front wheels back straight, if the user only moves the joystick left to the middle position, the front wheels will still not be straight. The user may have to move the joystick over the middle position to get the front wheels turn to left at an angular velocity in the direction opposite of the direction of the previous angular velocity in order to get the front wheels back straight. The parameters utilized on the command based turning control system are introduced later herein.

It is noted that, the vehicle auto turning control system provides for an auto articulation system. Changing the percentage of angular velocity of the front wheels, for example, via a steering joystick with other parameter input values activates and further performs auto articulation, as an embodiment shown in FIGS. 2-7C. The vehicle auto turning control system can also provide an auto steering system. Changing the percentage of angular velocity via an articulation joystick with other parameter input values activates and further performs auto steering for the front wheels, as another embodiment shown in FIGS. 8-13C. The auto articulation system and the auto steering control system can both exist in the vehicle auto turning control system (overall vehicle auto turning control system) such that the user can choose either the auto articulation system or the auto steering system.

Referring to FIG. 1, a motor grader 100 has front steering wheels 102 coupled to a beam 104. The front steering wheels 102 are configured to turn relative to the beam 104 about the steering axis 106 with a steering angle (not shown). The beam 104 is coupled to a body 108 of the motor grader 100. The motor grader 100 includes a first frame 110 and a second frame 112. The first frame 110 is configured to articulate relative to the second frame 112 about the articulation axis 114 with an articulation angle (not shown). In a cabin/cab/operator's station 116 of the motor grader 100 are a steering joystick 118 controlling the front steering wheels 102 steering and an articulation joystick 120 controlling the articulation between the first frame 110 and the second frame 112.

Referring to FIG. 2, the controller 200 receives various signals from multiple elements, processes those inputs for auto articulation, and transmits signals to control the steering actuator(s) 180 and articulation actuator(s) 190. The controller 200 herein may be a singular or a combination of multiple controllers. For example, the controller 200 can be vehicle controller, cabin controller, or combination of both. The controller 200 may include or be coupled to a memory for containing programming, such as algorithms. The user may press an auto articulation activation button 122 that is accessible to the user causing the controller 200 to receive a signal indicative of auto articulation activation command 132 (shown in FIG. 4) to satisfy at least one of the prerequisites of auto articulation activation (or it could override other signals to engage the auto articulation). The controller 200 receives a signal indicative of a percentage, configured to scale down a full angular velocity, from a steering joystick sensor 1182, which is positioned on or adjacent to a steering joystick 118. Alternatively, the steering joystick 118 may be mechanically coupled to an element (still a type of sensor) that provides a signal indicative of the position of the steering joystick 118. The controller 200 further receives a signal indicative of one of the modes (auto articulation modes); for example, a mode selector 124 located on a panel accessible to a user may have multiple buttons, each of which respectively corresponds to a type of auto articulation mode. In later description in FIGS. 4-6, a first mode (first auto articulation mode) 1242 and a second mode (second auto articulation mode) 1244 are described for explanatory purposes. The controller 200 also receives a signal indicative of steering angle from a steering angle sensor 126, and a signal indicative of an articulation angle from an articulation sensor 128. The steering angle sensor 126 may be positioned on or adjacent to the axis or a wheel rim. The articulation angle sensor 128 may be positioned on or adjacent to at least one of the first frame 110, second frame 112 and a joint between the first and second frames 110, 112. The controller 200 processes more than one of the above-mentioned inputs and transmits a signal indicative of steering command to control the steering actuator 180 and a signal indicative of articulation command to control the articulation actuator 190 in response to at least some of the above-mentioned inputs. The steering command and articulation command during auto articulation will be at least introduced in FIGS. 3A and 3B.

Referring to FIGS. 3A and 3B, the former illustrates a closed loop steering control and the latter illustrates a closed loop articulation control, performing auto articulation. In FIG. 3A, a steering desired angle is calculated by the controller 200 and will be elaborated in later description. A signal indicative of steering desired angle 261 and a signal indicative of steering (actual) angle 127 will be processed in a summing point 202 (equivalent to summing operator block 260 shown in FIG. 5) which subtracts inputs. The steering desired angle 261 minus the steering (actual) angle 127 detected by the steering angle sensor 126 at the summing point 202 is defined as auto articulation steering error 262. The auto articulation steering error 262 may be directly used as the steering command, or optionally, be transmitted to a steering adjustment circuit 204 that could be included in or coupled to the controller 200 to transform, modify or adjust the auto articulation steering error 262 into the steering command as shown in FIG. 3A. At least one (front) steering actuator 180 receives the steering command to extend or contract in order to turn the front wheels 102 and thereby the steering angle 127 is changed. The steering angle sensor 126 detects the steering (actual) angle 127, and a subsequent signal indicative of the steering angle 127 is again received by the summing point 202 for another round of calculation.

In FIG. 3B, an articulation desired angle is calculated by the controller 200 and will be elaborated in later description. A signal indicative of articulation desired angle 308 and a signal indicative of articulation actual angle 129 will be processed in a summing point 206. The articulation desired angle 308 minus the articulation actual angle 129 detected by the articulation angle sensor 128 at the summing point 206 is defined as auto-articulation articulation error 306. The auto-articulation articulation error 306 may be directly used as the articulation command, or optionally, be transmitted to an articulation adjustment circuit 208 that could be included in or coupled to the controller 200 to transform, modify or adjust the auto-articulation articulation error 306 into the articulation command as shown in FIG. 3B. At least one articulation actuator 190 receives the articulation command to extend or contract in order to turn the first frame 110 and/or second frame 220 and thereby the articulation angle 129 is changed. The articulation angle sensor 128 detects the articulation (actual) angle 129, and a subsequent signal indicative of the articulation (actual) angle 129 is again received by the summing point 206 for another round of calculation.

Figure 5:
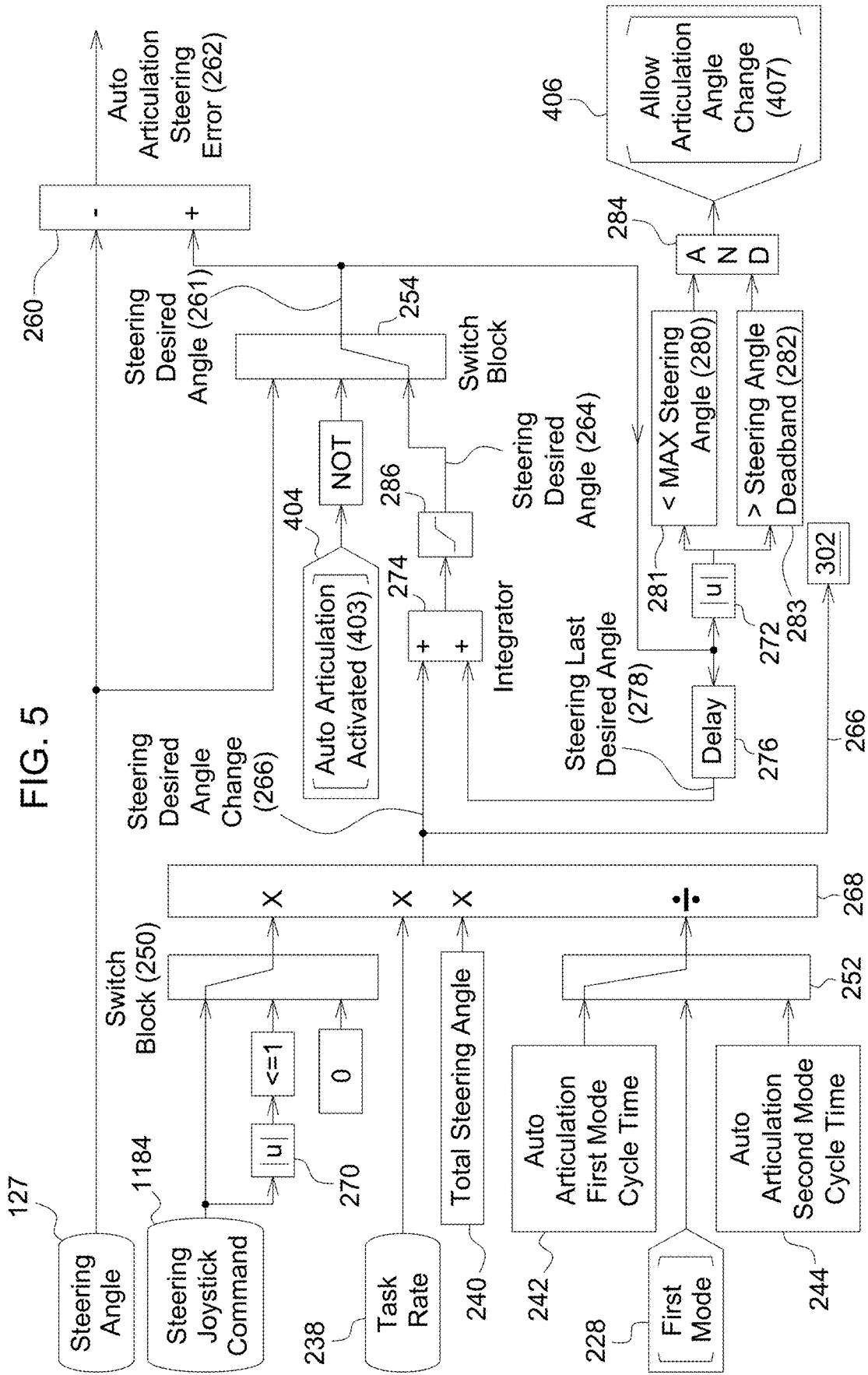
FIG. 5 is a block diagram demonstrating how a steering module works under a first mode of auto articulation.
Figure 6:
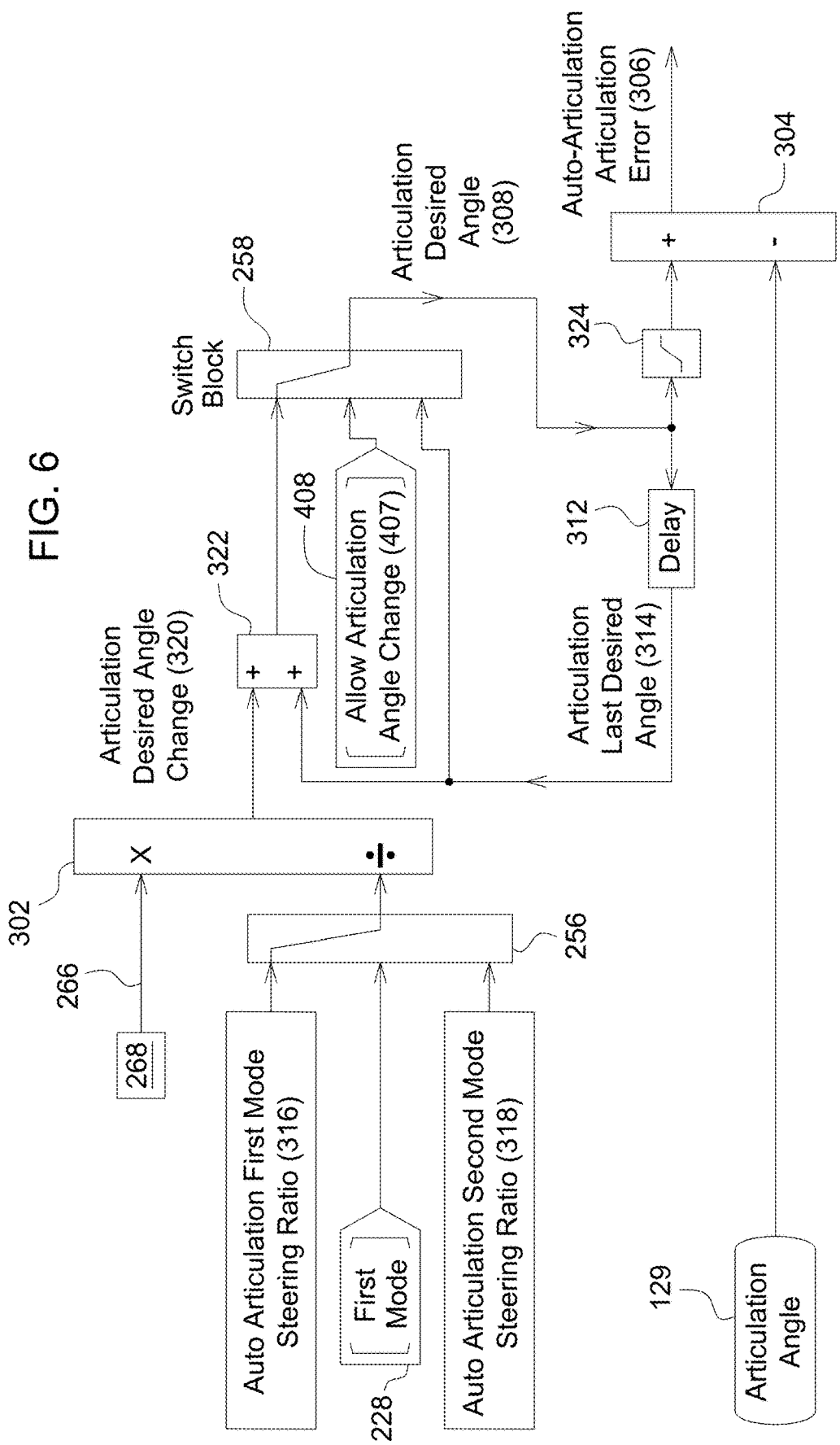
FIG. 6 is a block diagram demonstrating how an articulation module works under the first mode of auto articulation.

FIGS. 4-6 illustrate the interactions between components by adopting some features of a graphical programming environment, Simulink®, developed by MathWorks®. In FIGS. 4-6, each element surrounded by a capsule shaped boundary means that there is a signal indicative of a corresponding element transmitted. The object that directly or indirectly creates such a signal is omitted in those figures for clarity. The object may be one of the following formats: button, icon on a touch panel, joystick, memory, etc. If a command is surrounded by a pair of brackets that are further surrounded by a tag with left arrow head (goto block), that means this command will go to different part of this figure or even another figure related to this figure, starting from a tag with a right arrow head (from block) having the same name of the command. For example, the Auto Articulation Activated (command) 403 surrounded by a pair of bracket and the tag with left arrow head (i.e. Auto Articulation Activated goto block 402) in FIG. 4 will go to the tag with the right arrow head (i.e. Auto Articulation Activated from block 404) in FIG. 5. FIGS. 5 and 6 also include switch blocks (250, 252, 254, 256, 258). Each switch block (250, 252, 254, 256, 258) has three inputs on the left and one output on the left. The top and bottom inputs are regular inputs, but the middle input receives a conditional input. If the condition is true, the signal from the top input will pass to the output. On the contrary, if the condition is false (NOT), the signal from the bottom input will pass to output instead of the signal from the top input. The line inside the switch block indicates which input will pass to the output. For example, for the switch block 252, the output is Auto Articulation First Mode Cycle Time 242 because there is a command signal represented by a tag with a right arrow head [first mode] (first mode from block 228) transmitted to the middle input and the condition is true because the first mode is currently selected.

Referring to FIG. 4, the prerequisite for auto articulation operation is illustrated. The mode selector 124 is positioned in the cabin 116 accessible to the user. The mode selector 124 may include at least a first mode button (not shown) for creating a signal indicative of a first mode/first mode signal 1242 (First Mode shown in FIG. 4) and a second mode button (not shown) for creating a signal indicative of a second mode/second mode signal 1244 (Second Mode shown in FIG. 4). Once one of the modes is selected, either the first mode signal 1242 or the second mode signal 1244 carries a value equal to its own active value (as shown in relational operator blocks 220, 222) and such signal will be transmitted to the OR logic block 224 and a tag with a left arrow head corresponding to its mode (First Mode goto block 226 or Second Mode goto block 230). The OR logic block 224 ensures there is only one of the first mode signal 1242 and the second mode signal 1244 transmitted to an AND logic block 234 next to the OR logic block 224. For illustration purposes, the first mode is selected and the first mode signal/command 1242 is transmitted to the switch block 252 as shown in FIG. 5 and functioned as the conditional input as described previously.

Alternatively, the OR logic block 224 can be omitted if only one of the modes is selected by other means. Alternatively, it is possible to replace the OR logic block 224 with other type of operator that combines the signals of the two (e.g. addition, subtraction, multiplication, division or other ways) to create a new signal transmitted to the AND logic block 234.

The number of the modes for auto articulation in this embodiment is merely for demonstration. It is possible to have only one mode for the mode selector and therefore the OR logic block 224 can be omitted. In that situation, the signal indicative of the mode may be also functioned as Auto Articulation Activation Command and therefore in another embodiment, the input of the Auto Articulation Activation Command/signal 132 shown in FIG. 4 may be omitted. On the contrary to have a single mode, it is possible to have more than two modes for the user to select, with combination of other operator blocks.

With continued reference to FIG. 4, a signal indicative of return to straight command (return to straight signal 130) is provided by a button, icon or other means located on a panel, the mode selector, the joystick, or other component (not shown) that is accessible to the user. If the value of the signal equals the value of Return-To-Straight_INPROGRESS program (RTS_INPROGRESS) 236, that is, the Return-To-Straight_INPROGRESS program 236 is active, the signal 130 indicative of return to straight will pass "zero" to the AND logic block 234 to temporality disable auto articulation until the Return-To-Straight_INPROGRESS program 236 is complete. When the Return-To-Straight INPROGRESS program 236 is not executed, a signal indicative of Return-To-Straight INPROGRESS program 236 will pass "one" (TRUE) (because ~=operator) to the AND logic block 234 to satisfy one of the prerequisites to activate auto articulation. When Return To Straight_INPROGRESS program 236 is active, the articulation actuator(s) 190 may be actuated to make the articulation angle 129 straight back to zero degrees relative to the aft-and-fore direction. This execution of the Return To Straight_INPROGRESS program 236 may be easier or more preferred by the user to start auto articulation operation when there is no offset articulation angle. Alternatively, the Return-To-Straight_INPROGRESS program 236 can be replaced by another program that both of the steering angle and articulation angle 129 straight back to zero, or make only the steering angle 127 straight back to zero for the user before he or she starts auto articulation operation. However, in another embodiment, the execution of the Return-To-Straight_INPROGRESS program 236 or the other program mentioned above may be optional and the signal indicative of return to straight can be omitted and not to be transmitted to the AND logic block 234.

The signal indicative of Auto Articulation Activation Command 132 may be provided by a button, icon or other means located on a panel, the mode selector, the joystick, or other pressing element (not shown) that is accessible to the user. If the value of the signal indicative of Auto Articulation Activation Command 132 is not equal to zero (equality operator !=0) (i.e. the button/icon/pressing element for activating the auto articulation is pressed), the signal which output "one" (TRUE) is transmitted to the AND logic block 234 and one of the requirements/prerequisites to execute the Auto Articulation Activated command 403 is satisfied. That is, as shown in FIG. 4, one of the requirements/prerequisites to allow AND logic block 234 to pass "one" (TRUE) to Auto Articulation Activated goto block 420. In another embodiment, the signal indicative of Auto Articulation Activation Command 132 could override other signals to enforce the auto articulation; for example, the signal, instead of being transmitted to the AND logic block 234, is transmitted to an additional OR logic block (not shown) which also receives the output signal from the AND logic block 234, and the output of the additional OR logic block is the Auto Articulation Activated command 403. However, in another embodiment, the signal indicative of auto articulation activation command 132 can be omitted or integrated by the signal transmitted from the component of the mode selector 124 if there is only one mode on the mode selector 124.

Referring to FIGS. 1, 2, 4, and 5 a signal indicative of articulation joystick command 1204 may be provided by the articulation joystick 120 or the articulation joystick sensor (not shown) applied on or adjacent to the articulation joystick 120. In this embodiment, the value of the signal is equal to zero (FALSE) and the signal is transmitted to operator (==0), and such operator transmits a value of "one" (TRUE) to the AND logic block 234 and one of the requirements/prerequisites to execute the Auto Articulation Activated command 403 is satisfied. That is, as shown in FIG. 4, one of the requirements/prerequisites to allow AND logic block 234 to pass "one" (TRUE) to Auto Articulation Activated goto block 402. In this embodiment, the Auto Articulation Activated command 403 cannot be provided if the value of the signal from the articulation joystick 120 or the articulation joystick sensor (not shown) is not zero (i.e. Auto Articulation Activated goto block 402 cannot output a signal (TRUE) to the Auto Articulation Activated from block 404 shown in FIG. 5), that is, the user may now use the articulation joystick 120 and therefore there is no need for the auto articulation operation. It is noted that because the task rate 238, the period of time the auto articulation system recalculates, is normally short and therefore the movement of the articulation joystick 120 will stop the next Auto Articulation Activated command 403 (Auto Articulation Activated goto block 402 will not receive "one" from the AND logic block 234). That means, the movement of the articulation joystick 120 may interrupt the auto articulation operation. Alternatively, in another embodiment, the signal indicative of the articulation joystick command 1204 may not be provided to be transmitted to the AND logic block 234.

In this embodiment, the AND logic block 234 receives a signal indicative of one of the first and second modes 1242, 1244, a signal indicative of return to straight 130, a signal indicative of auto articulation activation command 132, and a signal indicative of articulation joystick command 1204. Other signals may also input to the AND logic block 234. Alternatively, the AND logic block 234 can also be omitted. For example, no matter if there are one or more modes, once at least one mode is selected, the signal indicative of the mode can also function as the auto articulation activation command 132, and the Auto Articulation Activated (command) 403 is provided.

Referring to FIG. 5, the signal indicative of the steering angle 127 may be provided by a steering angle sensor(s) 126 and transmitted to a summing operator block 260 (equivalent to the summing point 202 as shown in FIG. 3A). A signal indicative of auto articulation steering error 262 will be transmitted from the summing operator block 260 after a steering desired angle 261 minus the steering angle 127. The signal indicative of steering desired angle 261 is transmitted from the switch block 254. This switch block 254 has a NOT operator before the middle input. Therefore, if the auto articulation activated command 403 is activated (Auto Articulation Activated from block 404 output value "one" (TRUE)), the bottom input of the switch block 254, which is the steering desired angle 264, will pass to the output of the switch block 254 (the steering desire angle 261). The details of the steering desired angle 264 will be introduced in the next paragraph. On the contrary, if the auto articulation activated command 403 is not activated (the value of the Auto Articulation Activated from block 404 is "zero" (FALSE)), due to the NOT operator, the value of the middle input of the switch block 254 will be "one" (TRUE). Therefore, the signal indicative of the steering angle 127 is transmitted to the top input of the switch block 254 and will pass to the output (not shown); in this regard, the auto articulation steering error 262 is zero (steering angle 127 minus itself), that means, the steering actuator 180 will not be actuated because the auto articulation command/operation is not activated.

With continued reference to FIG. 5, a steering desired angle change 266 is determined at least partially by steering joystick command 1184, task rate 238, total steering angle 240, and auto articulation first mode cycle time 242 or auto articulation second mode cycle time 244, depending on which mode is operated. See the signals indicative of those parameters on the left of the product block 268. The signal indicative of the steering joystick command 1184 is transmitted to the switch block 250. The value of the steering joystick command 1184 is adjusted to an absolute value by an absolute block/Abs block 270, and the absolute value of the signal indicative of the steering joystick command 1184 is normally no more than one in order to scale down a full angular velocity. The switch block 250 is used to ensure the absolute value of the signal indicative of the steering joystick command 1184 is not greater than one in case there is an invalid value. If the absolute value of the steering joystick command 1184 is greater than one, a signal indicative of a value of "zero" (0) is transmitted from the switch block 250 to the product block 268 and making the steering desired angle change 266 to zero, that means, no change. Alternatively, in another embodiment, the switch block 250 can be omitted; the value of the signal indicative of steering joystick command 1184 will be directly transmitted to the product block 268.

A signal indicative of a total steering angle 240 is another input for the product block 268. It defines the magnitude of an angle the front wheel 102 is able to be turned. For example, if the maximum steering angle 240 is 40 degrees to the right and 40 degrees to the left, the total steering angle 240 is eighty degrees. The data of the total steering angle 240 may be stored in a memory coupled to the controller 200.

Referring to FIG. 5, the switch block 252 is configured to determine which auto articulation cycle time is used. The top input is a signal of auto articulation first mode cycle time 242 and the bottom input is a signal indicative of auto articulation second mode cycle time 244; the information/data of the auto articulation first mode cycle time 242 and the auto articulation second mode cycle time 244 are stored in the memory and the signals of which are transmitted from the memory. The middle input (condition input) is a signal indicative of the [first mode] command (represented by first mode from block 228) provided by the mode selector 124 as shown in FIG. 4. Because in this example the auto articulation system is operated based on the first mode, the signal indicative of auto articulation first mode cycle time 242 is transmitted to the switch block 252 and then transmitted to the product block 268 for calculation. On the contrary, if the user uses mode selector 124 to select the second mode, a signal indicative of the second mode command is transmitted to the middle input, the signal indicative auto articulation second mode cycle time 244 is transmitted to the switch block 252 and then transmitted to the product block 268 for calculation.

The task rate 238 is a period of time that the auto articulation system is given to steer the front wheel 102 based on current calculation. One example for the task rate 238 is 20 microseconds. The information/data of the task rate 238 is stored in the memory and the signal indicative of the task rate 238 is transmitted from the memory to the product block 268 for calculation.

In this embodiment, when the first mode is selected, the first mode full angular velocity equals the total steering angle 240 divided by the auto articulation first mode cycle time 242. The first mode full angular velocity is scaled down proportionally to determine the first mode angular velocity because it multiplies the percentage depending on the value of the signal indicative of the (steering) joystick command 1184, which is determined by the position of the joystick 118. The first mode angular velocity multiplies the task rate 238 equal to the steering desired angle change 266. The second mode angular velocity and the steering desired angle based on the second mode angular velocity can be determined in a similar fashion. It is noted that because multiplication and division are exchangeable, the above-mentioned parameters can be calculated in different order to obtain the steering desired angle change 266. The signal indicative of the steering desired angle change 266 is transmitted to a product block 302 as shown in FIG. 6.

Alternatively, the angular velocity may be calculated in different ways via the movement of the steering joystick 118. For example, the position of the steering joystick 118 may correspond to a lookup table (not shown). Different positions of the steering joystick 118 may correspond to different values assigned by the lookup table; each value does not have to be the percentage of travel of the steering joystick 118. Optionally, different modes may have different lookup tables. The system can have one auto articulation mode cycle time to divide the total steering angle 240 to get the full angular velocity. The full angular velocity multiplies the values of a first mode lookup table or a second mode lookup table to obtain the angular velocity under the first or second mode. The angular velocity multiplies task rate 238 to obtain the steering desired angle change 266. Alternatively, both total steering angle 240 and auto articulation cycle time can be replaced by the pre-set full angular velocity that multiplies the values of the first mode lookup table or the second mode lookup table to obtain the angular velocity under the first or second mode.

With continued reference to FIG. 5, after steering desired angle change 266 is calculated, the signal indicative of the steering desired angle change 266 is transmitted to an input of an integrator block 274. Another input of the integrator block 274 is the steering last desired angle 278. The integrator block 274 adds the steering desired angle change 266 and the steering last desired angle 278 to obtain steering desired angle 264. The signal indicative of steering desired angle 264 will be the signal indicative of steering desired angle 261 because the value of the auto articulation activated from block 404 is TRUE, and the signal indicative of steering desired angle 261 is transmitted to the summing operator block 260, a delay block 276, and an absolute block 272(|u|). The steering desired angle 261 minus steering angle 127 is calculated to obtain the auto articulation steering error 262 at the summing operator block 260 as discussed previously. The signal indicative of the steering desired angle 261 transmitted to the delay block 276 will delay a period of time close to or equal to the task rate 238 such that the output of the delay block 276 is the signal indicative of steering last desired angle 278, which will be transmitted to the integrator block 274 to calculate the next steering desired angle 264.

The steering desired angle 261 mentioned above may be used to determine whether to allow articulation angle change even if the auto articulation is activated (the value of the signal transmitted from Auto Articulation Activated from block 404 is TRUE). Two explanatory conditions are provided below. Referring to FIG. 5, the signal indicative of the steering desired angle 261 is transmitted to the absolute block 272 (|u|). (1) If the absolute value of the steering desired angle 261 is smaller than the maximum steering angle 280 (e.g. 40 degrees in this embodiment) designated in a comparison block 281, the comparison block 281 transmits a signal, the value of which is one (TRUE), to an AND logic block 284; if not, the value of the signal is zero (FALSE). (2) if the absolute value of the steering desired angle 261 is more than the steering angle deadband 282 (the value of the steering angle deadband is predefined, for example, between 5-10% of total steering angle) designated in another comparison block 283, such comparison block 283 transmits a signal, the value of which is one (TRUE), to the AND logic block 284; if not, the value of the signal is zero (FALSE). When both conditions are satisfied (both values are one/TRUE), the AND logic block 284 will transmit a signal indicative of Allow Articulation Angle Change command 407 (represented by Allow Articulation Angle Change goto block 406), which will go to the switch block 258 as shown in FIG. 6. That is, the middle input of the switch block 258 receive a value which is "one" (TRUE) from the Allow Articulation Angle Change from block 408. The signal indicative of allow articulation angle change 307 may be provided (TRUE) based on different conditions, such as merely one of above mentioned conditions (smaller than maximum steering angle or more than steering angle deadband) can be utilized to determine whether to allow articulation angle change.

The first condition mentioned above (smaller than maximum steering angle) is to prevent allowance of articulation angle change. With regard to the second condition mentioned above, deadband function allows the auto articulation system to remain activated at all times when other conditions are met. The user may not want this auto articulation performed (allowed) when the machine does straight or grading passes with slight steering desired angle change but the user may want the auto articulation performed when the machine turns around. The deadband function saves the user from having to turn on and off auto articulation activation frequently due to small percentage of total steering angle (e.g. 5% to 10% of 80 degrees). Alternatively, the deadband function can also be directly based on the percentage of the travel of the (steering) joystick 118. For example, if the steering joystick 118 is only moved under 10% of its maximum travel distance, the auto articulation angle change is not allowed (the value Allowed Articulation Angle Change command 407 is zero/FALSE) even though auto-articulation may be activated.

It is optional to have a saturator block (not shown) after the summing operator block 260 to limit the range of the auto articulation steering error 262. It is also optional to have another saturator block 286 as shown in FIG. 5 next to the integrator block 274 to limit the range of the steering desired angle 264.

Referring to FIGS. 2 and 6, the signal indicative of the articulation angle 129 may be provided by the articulation angle sensor(s) 128 and transmitted to a summing operator block 304 (equivalent to the summing point 206 as shown in FIG. 3B). A signal indicative of auto-articulation articulation error 306 will be transmitted from the summing operator block 304 after an articulation desired angle 308 minus the articulation angle 129 is calculated. The signal indicative of the articulation desired angle 308 is transmitted from the switch block 258. If the Allow Articulation Angle Change (command) 407 is present (condition is true), the articulation desire angle 308 that had been calculated and of which the signal indicative is transmitted to the top input of the switch block 258 will pass to the output as shown in FIG. 6. On the contrary, if the Allow Articulation Angle Change command 407 is not present (or condition is false), the signal indicative of the articulation last desired angle 314 is transmitted to the bottom input of the switch block 258 and will pass to the output (not shown); in this regard, the auto-articulation articulation error 306 equals to "zero" (FALSE) because the articulation last desired angle 314 minus the articulation angle 129 that has the same value of the articulation last desired angle 314 is zero. In this regard, referring to FIGS. 5 and 6, no signal indicative of "allow articulation angle change 407" is present (or the value of signal indicative of "allow articulation angle change command 407 is zero/FALSE) to keep the articulation angle 129 from continuing to ramp up after the steering desired angle 261 has reached its maximum angle, which is forty degrees in this embodiment.

The signal indicative of steering desired angle change 266 is transmitted to an product block 302 as one input. The other input is either one of auto articulation first mode steering ratio 316 or auto articulation second mode steering ratio 318. In FIG. 6, since the first mode is selected as described previously, the auto articulation first mode steering ratio 316 is transmitted to the product block 302. It is noted that because one of the inputs is a steering ratio, it divides the steering desired angle change 266 to obtain the articulation desired angle change 320; alternatively, if such input is an articulation ratio, the articulation ratio may multiply the steering desired angle change 266 to obtain the articulation desired angle change 320. Therefore, different types of ratios stored in the memory and different types of operators are able to be used for calculating the articulation desired angle change 320.

With continued reference to FIG. 6, after articulation desired angle change 320 is calculated, the signal indicative of the articulation desired angle change 320 is transmitted to an input of an integrator block 322. Another input of the integrator block 322 is the articulation last desired angle 314. The integrator block 322 adds the articulation desired angle change 320 and the articulation last desired angle 314 to obtain articulation desired angle 258, the signal indicative of which is transmitted to the summing operator block 304 and a delay block 312. The articulation desired angle 308 minus the articulation angle 129 is calculated to obtain the auto-articulation articulation error 306 at the summing operator block 304 as discussed previously. The signal indicative of the articulation desired angle 308 is transmitted to the delay block 312 that will delay a period of time close to or equal to the task rate 238 such that the output of the delay block 312 is a signal indicative of articulation last desired angle 314, which will be transmitted to the integrator block 322 to calculate the articulation desired angle 308.

It is optional to have a saturator block (not shown) after the summing operator block 304 to limit the range of the auto-articulation articulation error 306. It is also optional to have another saturator block 324 as shown in FIG. 6 before the summing operator block 304 to limit the range of the articulation desired angle 308.

From FIGS. 5, 6, it is possible that no articulation joystick needed to be involved to perform auto articulation.

Figure 7A:
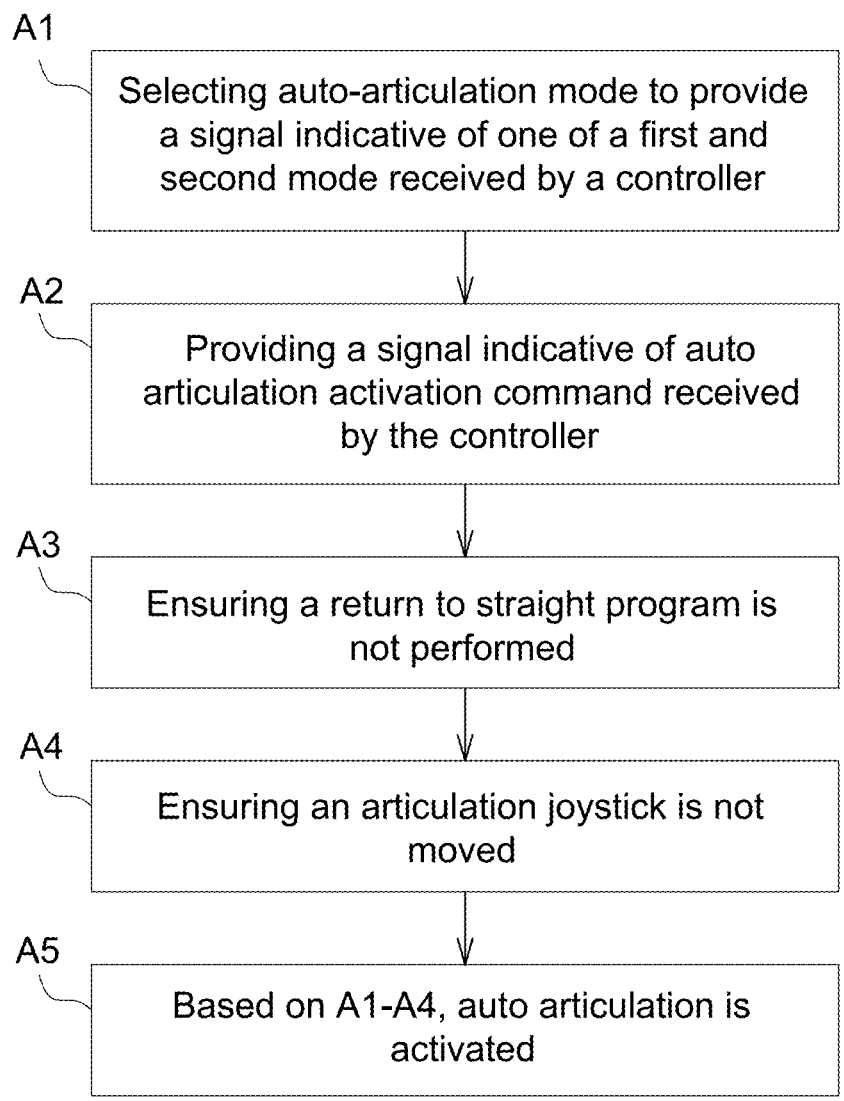
FIG. 7A is a block diagram illustrating a method for activating auto articulation.

FIG. 7A illustrates a method for activating auto articulation. The following steps A1-A4 could be exchanged or omitted.

A1: Selecting auto-articulation mode to provide a signal indicative of one of a first and second mode received by a controller. In this embodiment, the first mode is selected (selection is not shown).

A2: Providing a signal indicative of auto articulation activation command received by the controller.

A3: Ensuring a return to straight program is not performed.

A4: Ensuring an articulation joystick is not moved.

A5: Based on A1-A4, auto articulation is activated.

Figure 7B:
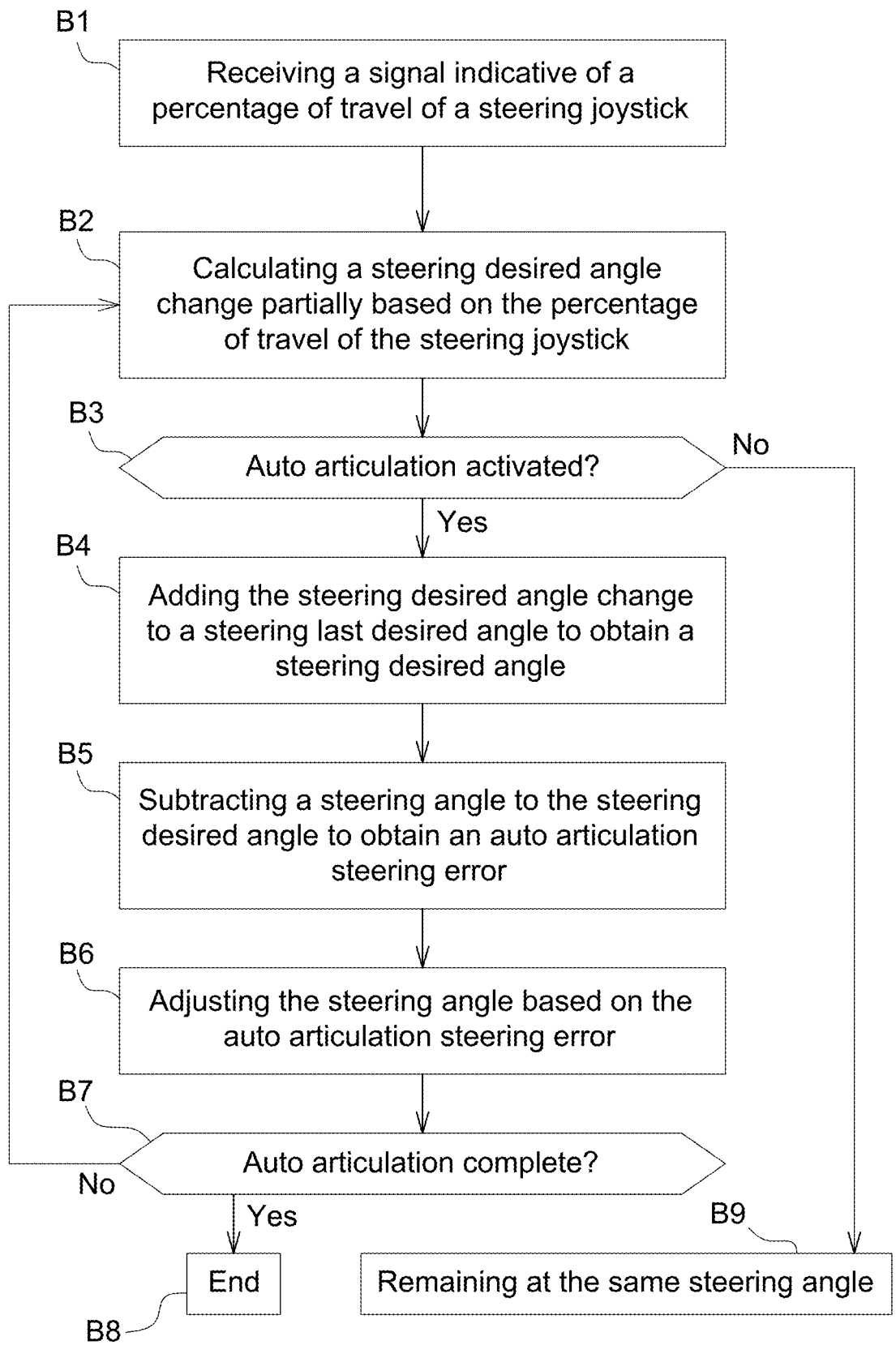
FIG. 7B is a block diagram illustrating a method for adjusting steering angle when auto articulation is operated.

FIG. 7B illustrates a method for adjusting steering angle when auto articulation is operated:

B1: Receiving a signal indicative of a percentage of travel of a steering joystick;

B2: Calculating a steering desired angle change partially based on the percentage of travel of the steering joystick. To calculate the steering desired angle change, the method may include but is not limit to the following ways:

(1) multiplying the percentage of travel of the steering joystick, a task rate, a total steering angle, and dividing by an auto articulation cycle time that corresponds to the mode selected in Step A1. In this embodiment, the first mode is selected and therefore auto articulation first mode cycle time is used to divide the multiplication of percentage of travel of the steering joystick, task rate, total steering angle.

(2) multiplying a value of one of the lookup tables corresponding to the percentage of travel of the steering joystick, task rate, total steering angle, and dividing by auto articulation cycle time. The lookup tables include at least a first mode lookup table and a second mode lookup table. Since the first mode is selected, it is the first mode lookup table used for calculation.

(3) multiplying a value of one of the lookup tables corresponding to the percentage of travel of the steering joystick, task rate, and a pre-set full angular velocity. The lookup tables include at least a first mode lookup table and a second mode lookup table. Since the first mode is selected, it is the first mode lookup table used for calculation.

B3: Determining whether the auto articulation is activated. If yes, go to B4; if not, go to B9.

B4: Adding the steering desired angle change to a steering last desired angle to obtain a steering desired angle. Optionally the steering desired angle is obtained after the saturation of the sum of the steering desired angle change and the steering last desired angle. Optionally the steering desired angle is calculated based on the steering desired angle change and steering last desired angle. It is noted that the steering last desired angle is a previous steering desired angle that was delayed a period of time close to or equal to the task rate. B4 may further include comparing the absolute value of the steering desired angle with maximum steering angle. If the absolute value of the steering desired angle is smaller than maximum steering angle that front wheels can turn, a signal indicative of allow articulation angle change is provided and will be used in the method of adjusting articulation angle when the auto articulation is operated.

B5: Subtracting a steering angle detected by a steering angle sensor to the steering desired angle to obtain an auto articulation steering error.

B6: Adjusting the steering angle based on the auto articulation steering error.

B7: Determining whether the auto articulation is complete. If yes, go to B8; if not, go to B2. There are many ways to determine whether the auto articulation is complete. For example, if first mode is selected, the auto articulation first mode cycle time is divided by the percentage of the travel of the steering joystick to calculate the time is needed to complete auto articulation operation. For instance, if the auto articulation first mode cycle time is 10 seconds and the percentage of the travel for the steering joystick is 50%, the auto articulation needs 20 seconds to complete. Another example is to use the lookup tables mentioned in B2(2) or B2(3) that may have a corresponding time to complete auto articulation at least partially based on the percentage of steering joystick and the mode.

B8: Auto articulation is complete. The calculation is end.

B9: Remaining at the same steering angle. Because the auto articulation is not activated, subtracting the steering angle detected by a steering angle sensor to the same steering angle makes the auto articulation steering error zero which cannot be used to adjust steering angle.

Figure 7C:
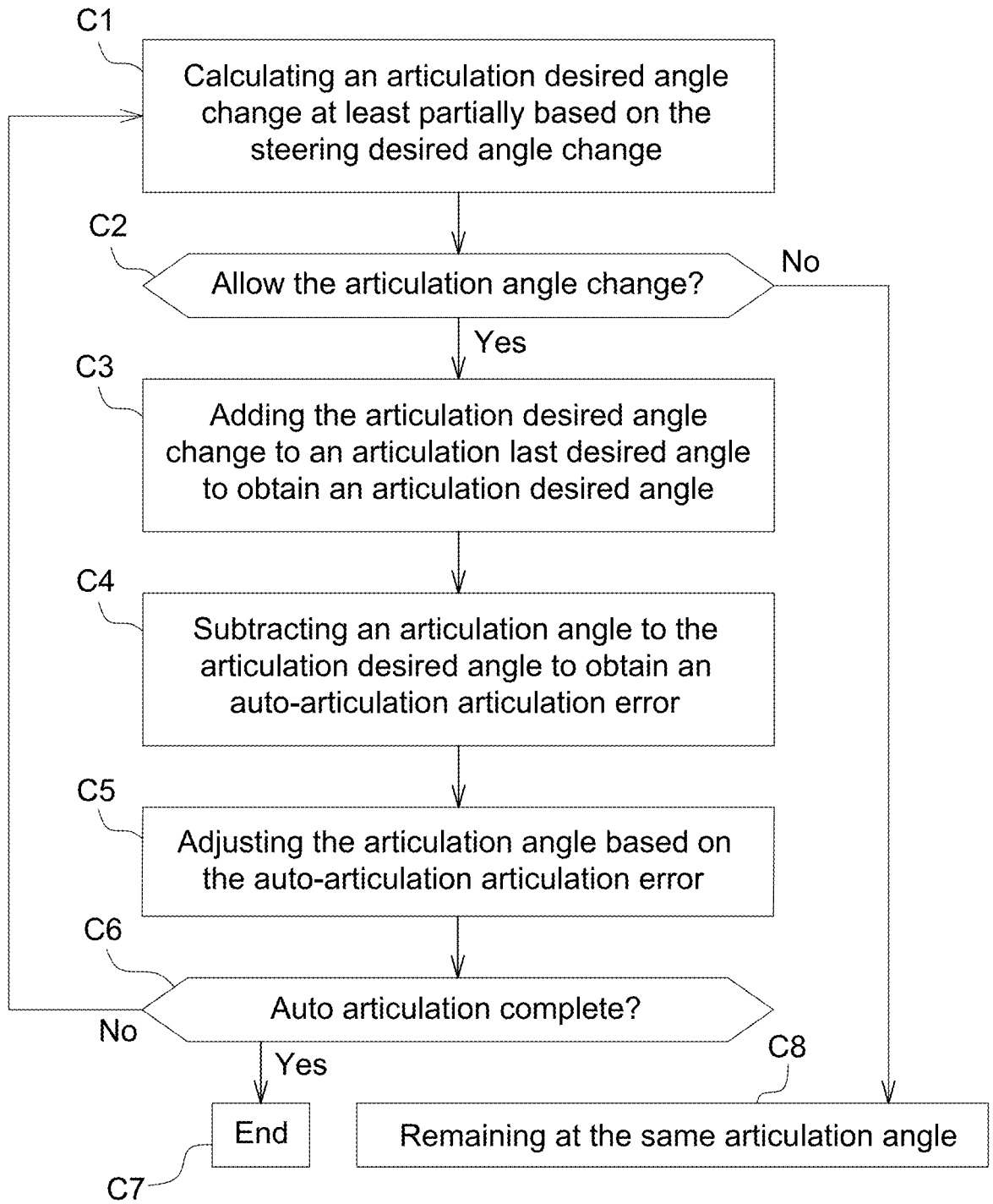
FIG. 7C is a block diagram illustrating a method for adjusting articulation angle when auto articulation is operated.

FIG. 7C illustrates a method for adjusting articulation angle when auto articulation is operated:

C1: Calculating an articulation desired angle change at least partially based on the steering desired angle change. In this embodiment, the steering desired angle change is divided by an auto articulation steering ratio to obtain the articulation desired angle change. Auto articulation steering ratio may include auto articulation first mode steering ratio and auto articulation second mode steering ratio. In this embodiment, since the first mode is selected, the steering desired angle change is divided by the auto articulation first mode steering ratio to obtain the articulation desired angle change. Alternatively, the steering desired angle change multiplies by the auto-articulation articulation ratio (reciprocal of the auto articulation steering ratio) to obtain the articulation desired angle change.

C2: Determining whether the articulation angle change is allowed. If yes, go to C3; if no, go to C8. It is noted that there are many ways to determine whether to allow the articulation angle change, which may include but is not limit to the following ways: (1) checking whether the absolute value of the steering desired angle is smaller than the maximum steering angle; and/or (2) checking whether the absolute value of the steering desired angle is more than the steering angle deadband. Alternatively, another type of the deadband function can be utilized when checking whether the movement of the steering joystick is more than a pre-set small percentage of its maximum travel distance (threshold).

C3: Adding the articulation desired angle change to an articulation last desired angle to obtain an articulation desired angle. Optionally the articulation desired angle is obtained after the saturation of the sum of the articulation desired angle change and the articulation last desired angle. It is noted that the articulation last desired angle is a previous articulation desired angle that was delayed a period of time close to or equal to the task rate.

C4: Subtracting an articulation angle detected by an articulation angle sensor from the articulation desired angle to obtain an auto-articulation articulation error.

C5: Adjusting the articulation angle based on the auto-articulation articulation error.

C6: Determining whether the auto articulation is complete. If yes, go to C7; if not, go to C1. The method for determining the completeness of the auto articulation is described in step B7.

C7: Auto articulation is complete. The calculation is end.

C8: Remaining at the same articulation angle. Because the signal indicative of allow articulation angle change command is not present (or FALSE), subtracting the articulation angle detected by an articulation angle sensor from the articulation last desired angle makes the auto articulation steering error zero which cannot be used to adjust articulation angle.

FIGS. 8-12 illustrate an auto steering system, and the operation is substantially symmetric to the auto articulation. As described previously, the vehicle auto turning control system may include one of the auto articulation system and auto steering system, or both. Unlike FIG. 5 illustrating [Allow Articulation Angle Change command 407 partially determined by whether the steering desired angle 261 is more than the steering angle deadband, FIG. 11 omits the feature that Allow Steering Angle Change command is partially determined by whether the articulation desired angle is more than an articulation angle deadband but such omission may not be necessary in another embodiment. In another embodiment, the value of articulation angle deadband is predefined.

Figure 8:
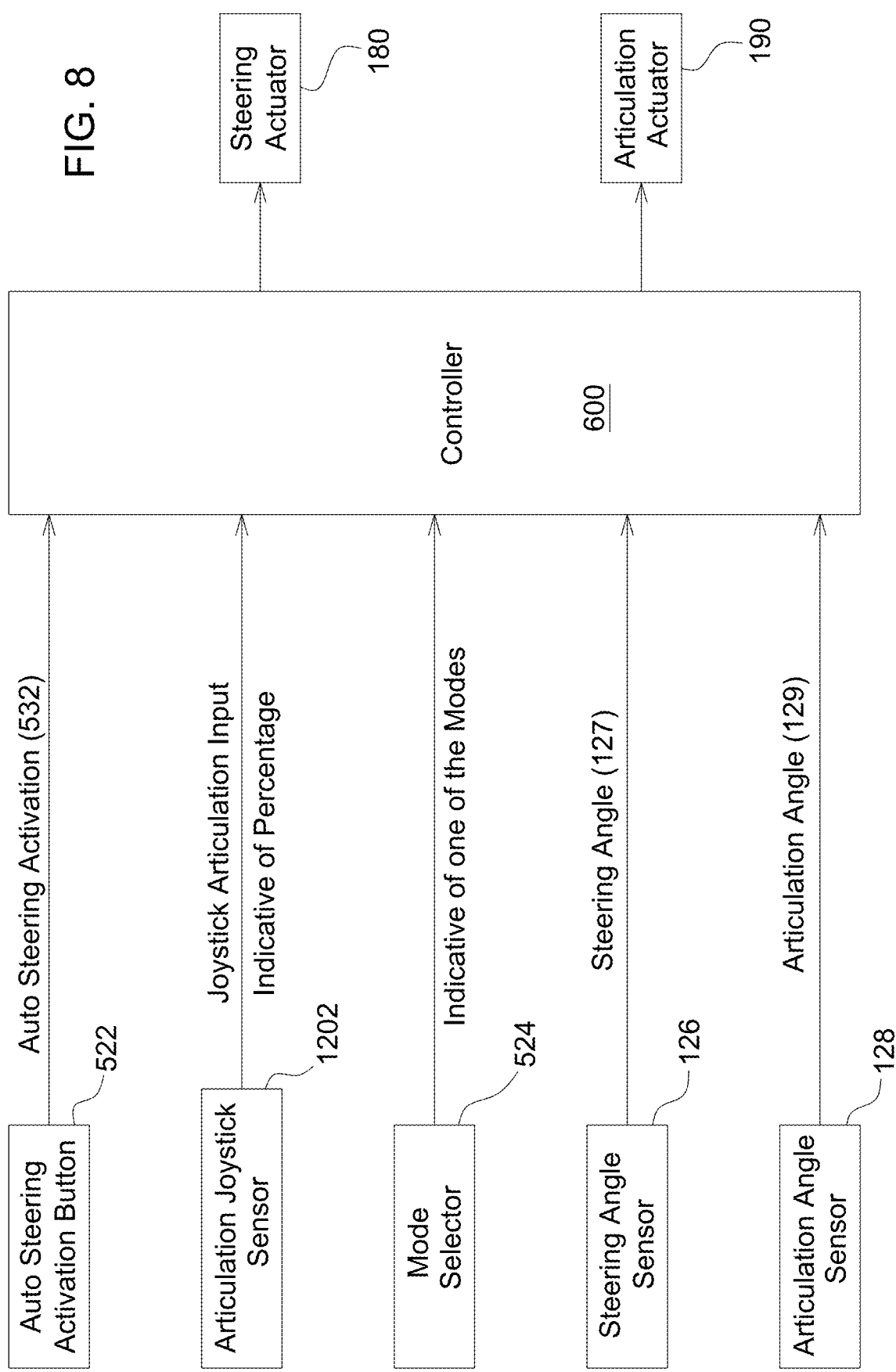
FIG. 8 is a diagrammatic view demonstrating a controller of the motor grader receiving signals from and transmitting signals to multiple elements in the motor grader.

Referring to FIG. 8, the controller 600, which may be the same as or different from the controller 200 as shown in FIG. 2, receives various signals from multiple elements, processes those inputs for auto steering, and transmits signals to control the steering actuator(s) 180 and articulation actuator(s) 190. The controller 600 herein may be a singular or a combination of multiple controllers. For example, the controller 600 can be vehicle controller, cabin controller, or combination of both. The controller 600 may include or be coupled to a memory for containing programming, such as algorithms. The user may press an auto steering activation button 522 that is accessible to the user causing the controller 600 to receive a signal indicative of auto steering activation command 532 (shown in FIG. 10) to satisfy at least one of the prerequisites of auto steering activation (or it could override other signals to engage the auto steering). The controller 600 receives a signal indicative of a percentage, configured to scale down a full angular velocity, from an articulation joystick sensor 1202, which is positioned on or adjacent to an articulation joystick 120. Alternatively, the articulation joystick 120 may be mechanically coupled to an element that provides a signal indicative of the position of the articulation joystick 120. The controller 600 further receives a signal indicative of one of the modes (auto steering modes); for example, a mode selector 524 located on a panel accessible to a user may have multiple buttons, each of which respectively corresponds to a type of auto articulation mode. In later description in FIGS. 10-12, a first mode (first auto steering mode) 5242 and a second mode (second auto steering mode) 5244 are described for explanatory purposes. The controller 600 also receives a signal indicative of steering angle from a steering angle sensor 126, and a signal indicative of an articulation angle from an articulation sensor 128. The steering angle sensor 126 may be positioned on or adjacent to the axis or a wheel rim. The articulation angle sensor 128 may be positioned on or adjacent to at least one of the first frame 110, second frame 112 and a joint between the first and second frames 110, 112. The controller 600 processes more than one of the above-mentioned inputs and transmits a signal indicative of steering command to control the steering actuator 180 and a signal indicative of articulation command to control the articulation actuator 190 in response to at least some of the above-mentioned inputs. The steering command and articulation command during auto articulation will be at least introduced in FIGS. 9A and 9B.

Referring to FIGS. 9A and 9B, the former illustrates a closed loop articulation control and the latter illustrates a closed loop steering control, performing auto articulation. In FIG. 9A, an articulation desired angle 661 is calculated by the controller 600 and will be elaborated in later description. A signal indicative of articulation desired angle 661 and a signal indicative of articulation (actual) angle 129 will be processed in a summing point 602 (equivalent to summing operator block 660 shown in FIG. 11) which subtracts inputs. The articulation desired angle 661 minus the articulation (actual) angle 129 detected by the articulation angle sensor 128 at the summing point 602 is defined as auto steering articulation error 662. The auto steering articulation error 662 may be directly used as the articulation command, or optionally, be transmitted to an articulation adjustment circuit 604 that could be included in or coupled to the controller 600 to transform, modify or adjust the auto steering articulation error 662 into the articulation command as shown in FIG. 9A. At least one (front) articulation actuator 190 receives the articulation command to extend or contract in order to turn the first frame 110 and/or second frame 220 and thereby the articulation angle 129 is changed. The articulation angle sensor 128 detects the articulation (actual) angle 129, and a subsequent signal indicative of the articulation angle 129 is again received by the summing point 602 for another round of calculation.

In FIG. 9B, a steering desired angle is calculated by the controller 600 and will be elaborated in later description. A signal indicative of steering desired angle 708 and a signal indicative of steering actual angle 127 will be processed in a summing point 606. The steering desired angle 708 minus the steering actual angle 127 detected by the steering angle sensor 126 at the summing point 606 is defined as auto-steering steering error 706. The auto-steering steering error 706 may be directly used as the steering command, or optionally, be transmitted to a steering adjustment circuit 608 that could be included in or coupled to the controller 600 to transform, modify or adjust the auto-steering steering error 706 into the steering command as shown in FIG. 9B. At least one steering actuator 180 receives the steering command to extend or contract in order to turn the front wheel 102 and thereby the steering angle 127 is changed. The steering angle sensor 126 detects the steering (actual) angle 127, and a subsequent signal indicative of the steering (actual) angle 127 is again received by the summing point 606 for another round of calculation.

Figure 11:
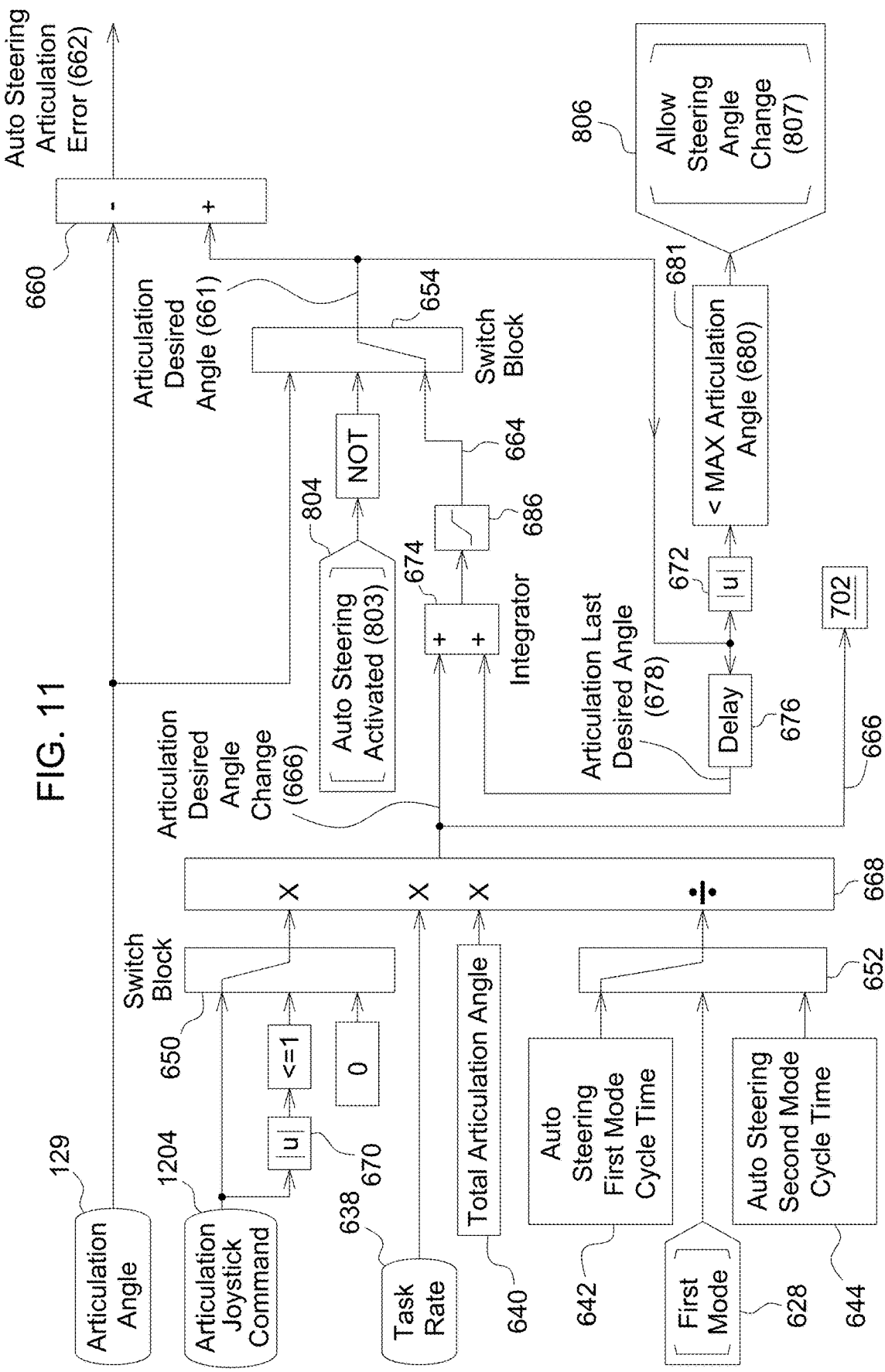
FIG. 11 is a block diagram demonstrating how an articulation module works under a first mode of auto steering.

Referring to FIG. 10, the prerequisite for auto steering operation is illustrated. The mode selector 524 is positioned in the cabin 116 accessible to the user. The mode selector 524 may include at least a first mode button (not shown) for creating a signal indicative of a first mode/first mode signal 5242 (First Mode shown in FIG. 10) and a second mode button (not shown) for creating a signal indicative of a second mode/second mode signal 5244 (Second Mode shown in FIG. 10). Once one of the modes is selected, either the first mode signal 5242 or the second mode signal 5244 carries a value equal to its own active value (as shown in relational operator blocks 620, 622) and such signal will be transmitted to the OR logic block 624 and a tag with a left arrow head corresponding to its mode (First Mode goto block 626 or Second Mode goto block 630). The OR logic block 624 ensures there is only one of the first mode signal 5242 and the second mode signal 5244 transmitted to an AND logic block 634 next to the OR logic block 624. For illustration purposes, the first mode is selected and the first mode signal/command 5242 is transmitted to the switch block 652 as shown in FIG. 11 and functioned as the conditional input as described previously.

Alternatively, the OR logic block 624 can be omitted if only one of the modes is selected by other means. Alternatively, it is possible to replace the OR logic block 624 with other type of operator that combines the signals of the two (e.g. addition, subtraction, multiplication, division or other ways) to create a new signal transmitted to the AND logic block 634.

The number of the modes for auto steering in this embodiment is merely for demonstration. It is possible to have only one mode for the mode selector and therefore the OR logic block 624 can be omitted. In that situation, the signal indicative of the mode may be also functioned as Auto Steering Activation Command and therefore in another embodiment, the input of the Auto Steering Activation Command/signal 532 shown in FIG. 10 may be omitted. On the contrary to have a single mode, it is possible to have more than two modes for the user to select, with combination of other operator blocks.

With continued reference to FIG. 10, a signal indicative of return to straight command (return to straight signal 530) is provided by a button, icon or other means located on a panel, the mode selector, the joystick, or other component (not shown) that is accessible to the user. If the value of the signal equals the value of Return-To-Straight_INPROGRESS program (RTS_INPROGRESS) 636, that is, the Return-To- Straight_INPROGRESS program 636 is active, the signal 130 indicative of return to straight will pass "zero" to the AND logic block 634 to temporality disable auto steering until the Return-To-Straight_INPROGRESS program 636 is complete. When the Return-To-Straight INPROGRESS program 636 is not executed, a signal indicative of Return-To-Straight INPROGRESS program 636 will pass "one" (TRUE) (because ~=operator) to the AND logic block 634 to satisfy one of the prerequisites to activate auto steering. When Return To Straight_INPROGRESS program 636 is active, the steering actuator(s) 180 may be actuated to make the steering angle 127 straight back to zero degrees relative to the aft-and-fore direction. This execution of the Return To Straight_INPROGRESS program 636 may be easier or more preferred by the user to start auto steering operation when there is no offset steering angle. Alternatively, the Return-To-Straight_INPROGRESS program 636 can be replaced by another program that both of the steering angle and articulation angle straight back to zero, or make only the articulation angle straight back to zero for the user before he or she starts auto steering operation. However, in another embodiment, the execution of the Return-To-Straight_INPROGRESS program 636 or the other program mentioned above may be optional and the signal indicative of return to straight can be omitted and not to be transmitted to the AND logic block 634.

The signal indicative of Auto Steering Activation Command 532 may be provided by a button, icon or other means located on a panel, the mode selector, the joystick, or other pressing element (not shown) that is accessible to the user. If the value of the signal indicative of Auto Steering Activation Command 532 is not equal to zero (equality operator !=0) (i.e. the button/icon/pressing element for activating the auto steering is pressed), the signal which output "one" (TRUE) is transmitted to the AND logic block 634 and one of the requirements/prerequisites to execute the Auto Steering Activated command 803 is satisfied. That is, as shown in FIG. 10, one of the requirements/prerequisites to allow AND logic block 634 to pass "one" (TRUE) to Auto Steering Activated goto block 420. In another embodiment, the signal indicative of Auto Steering Activation Command 532 could override other signals to enforce the auto steering; for example, the signal, instead of being transmitted to the AND logic block 634, is transmitted to an additional OR logic block (not shown) which also receives the output signal from the AND logic block 634, and the output of the additional OR logic block is the Auto Steering Activated command 803. However, in another embodiment, the signal indicative of auto steering activation command 532 can be omitted or integrated by the signal transmitted from the component of the mode selector 524 if there is only one mode on the mode selector 524.

Referring to FIGS. 1, 8, 10, and 11 a signal indicative of steering joystick command 1184 may be provided by the steering joystick 118 or the steering joystick sensor (not shown) applied on or adjacent to the steering joystick 118. In this embodiment, the value of the signal 1184 is equal to zero (FALSE) and the signal is transmitted to operator (==0), and such operator transmits a value of "one" (TRUE) to the AND logic block 634 and one of the requirements/prerequisites to execute the Auto Steering Activated command 803 is satisfied. That is, as shown in FIG. 10, one of the requirements/prerequisites to allow AND logic block 634 to pass "one" (TRUE) to Auto Steering Activated goto block 802. In this embodiment, the Auto Steering Activated command 803 cannot be provided if the value of the signal from the steering joystick 118 or the steering joystick sensor (not shown) is not zero (i.e. Auto Steering Activated goto block 802 cannot output a signal (TRUE) to the Auto Steering Activated from block 804 shown in FIG. 11), that is, the user may now use the steering joystick 118 and therefore there is no need for the auto steering operation. It is noted that because the task rate 638, the period of time the auto steering system recalculates, is normally short and therefore the movement of the steering joystick 118 will stop the next Auto Steering Activated command 803 (Auto Steering Activated goto block 802 will not receive "one" from the AND logic block 634). That means, the movement of the steering joystick 118 may interrupt the auto steering operation. Alternatively, in another embodiment, the signal indicative of the steering joystick command 1184 may not be provided to be transmitted to the AND logic block 634.

In this embodiment, the AND logic block 634 receives a signal indicative of one of the first and second modes 5242, 5244, a signal indicative of return to straight 530, a signal indicative of auto steering activation command 532, and a signal indicative of steering joystick command 1184. Other signals may also input to the AND logic block 634. Alternatively, the AND logic block 634 can also be omitted. For example, no matter if there are one or more modes, once at least one mode is selected, the signal indicative of the mode can also function as the auto steering activation command 532, and the Auto Steering Activated (command) 803 is provided.

Referring to FIG. 11, the signal indicative of the articulation angle 129 may be provided by an articulation angle sensor(s) 128 and transmitted to a summing operator block 660 (equivalent to the summing point 602 as shown in FIG. 9A). A signal indicative of auto steering articulation error 662 will be transmitted from the summing operator block 660 after an articulation desired angle 661 minus the articulation angle 129. The signal indicative of articulation desired angle 661 is transmitted from the switch block 654. This switch block 654 has a NOT operator before the middle input. Therefore, if the auto steering activated command 803 is activated (Auto Steering Activated from block 804 output value "one" (TRUE)), the bottom input of the switch block 654, which is the articulation desired angle 664, will pass to the output of the switch block 654 (the articulation desire angle 661). The details of the articulation desired angle 664 will be introduced in the next paragraph. On the contrary, if the auto steering activated command 803 is not activated (the value of the Auto Steering Activated from block 804 is "zero" (FALSE)), due to the NOT operator, the value of the middle input of the switch block 654 will be "one" (TRUE). Therefore, the signal indicative of the articulation angle 129 is transmitted to the top input of the switch block 654 and will pass to the output (not shown); in this regard, the auto steering articulation error 662 is zero (articulation angle 129 minus itself), that means, the articulation actuator 190 will not be actuated because the auto steering command/operation is not activated.

With continued reference to FIG. 11, an articulation desired angle change 666 is determined at least partially by articulation joystick command 1204, task rate 638, total articulation angle 640, and auto steering first mode cycle time 642 or auto steering second mode cycle time 644, depending on which mode is operated. See the signals indicative of those parameters on the left of the product block 668. The signal indicative of the articulation joystick command 1204 is transmitted to the switch block 650. The value of the articulation joystick command 1204 is adjusted to an absolute value by an absolute block/Abs block 670, and the absolute value of the signal indicative of the articulation joystick command 1204 is normally no more than one in order to scale down a full angular velocity. The switch block 650 is used to ensure the absolute value of the signal indicative of the articulation joystick command 1204 is not greater than one in case there is an invalid value. If the absolute value of the articulation joystick command 1204 is greater than one, a signal indicative of a value of "zero" (0) is transmitted from the switch block 650 to the product block 668 and making the articulation desired angle change 666 to zero, that means, no change. Alternatively, in another embodiment, the switch block 650 can be omitted; the value of the signal indicative of articulation joystick command 1204 will be directly transmitted to the product block 668.

A signal indicative of a total articulation angle 640 is another input for the product block 668. It defines the magnitude of an angle the first frame 110 and the second frame 112 are able to be turned relative to one another. For example, if the maximum articulation angle 640 is 20 degrees to the right and 20 degrees to the left, the total articulation angle 640 is forty degrees. The data of the total articulation angle 640 may be stored in a memory coupled to the controller 600. The 20 degrees of the maximum articulation angle 640 here is only for demonstration; it can be other degrees.

Referring to FIG. 11, the switch block 652 is configured to determine which auto steering cycle time is used. The top input is a signal of auto steering first mode cycle time 642 and the bottom input is a signal indicative of auto steering second mode cycle time 644; the information/data of the auto steering first mode cycle time 642 and the auto steering second mode cycle time 644 are stored in the memory and the signals of which are transmitted from the memory. The middle input (condition input) is a signal indicative of the [first mode] command (represented by first mode from block 628) provided by the mode selector 524 as shown in FIG. 10. Because in this example the auto steering system is operated based on the first mode, the signal indicative of auto steering first mode cycle time 642 is transmitted to the switch block 652 and then transmitted to the product block 668 for calculation. On the contrary, if the user uses mode selector 524 to select the second mode, a signal indicative of the second mode command is transmitted to the middle input, the signal indicative auto articulation second mode cycle time 644 is transmitted to the switch block 652 and then transmitted to the product block 668 for calculation.

The task rate 638 is a period of time that the auto steering system is given to articulate the first frame 110 relative to the second frame 112 based on current calculation. One example for the task rate 638 is 20 microseconds. The information/data of the task rate 638 is stored in the memory and the signal indicative of the task rate 638 is transmitted from the memory to the product block 668 for calculation.

Figure 12:
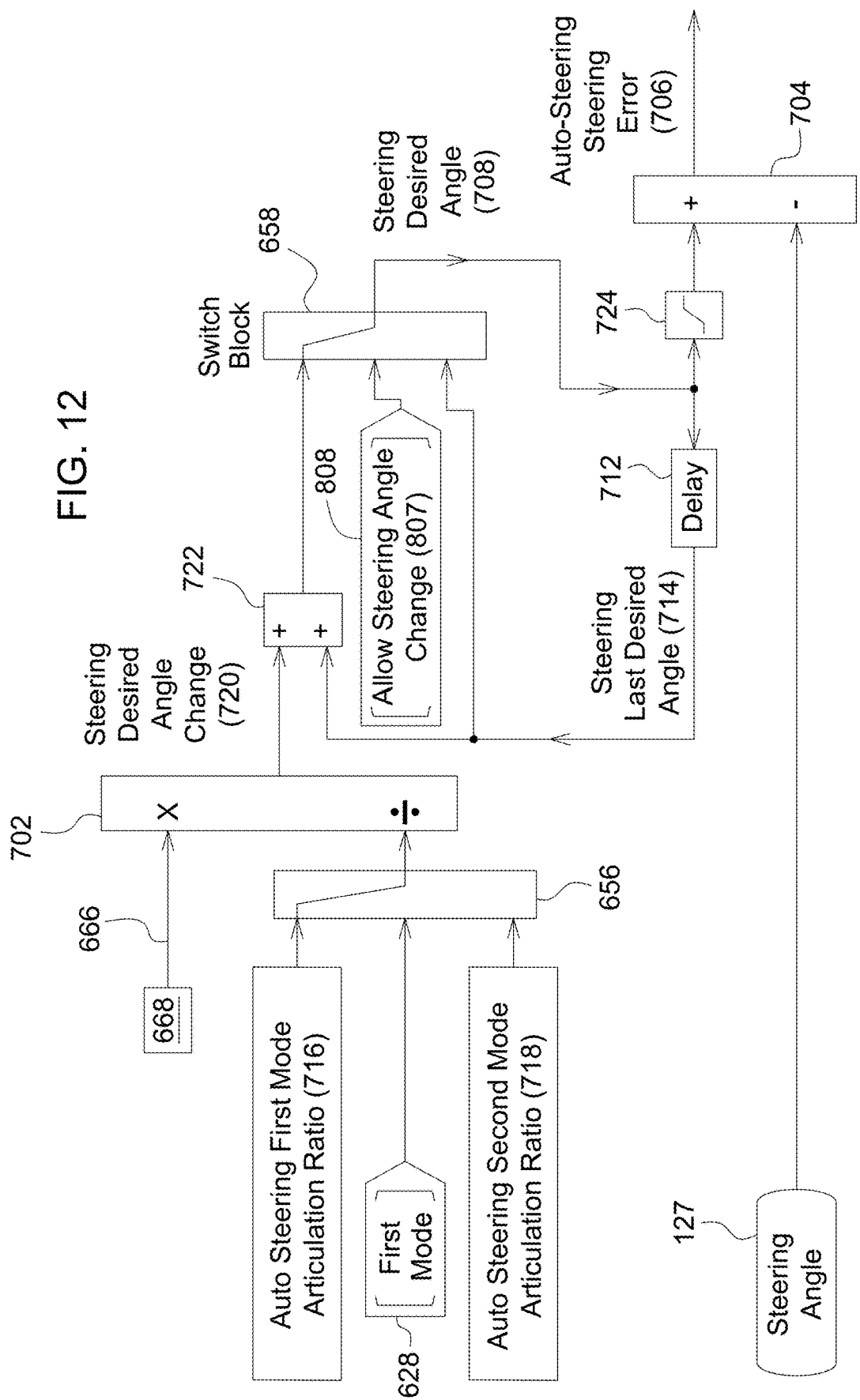
FIG. 12 is a block diagram demonstrating how a steering module works under the first mode of auto steering.

In this embodiment, when the first mode is selected, the first mode full angular velocity for the rotation between the first frame 110 and the second frame 112 equals the total articulation angle 640 divided by the auto steering first mode cycle time 642. The first mode full angular velocity is scaled down proportionally to determine the first mode angular velocity because it multiplies the percentage depending on the value of the signal indicative of the (articulation) joystick command 1204, which is determined by the position of the joystick 120. The first mode angular velocity multiplies the task rate 638 equal to the articulation desired angle change 666. The second mode angular velocity and the articulation desired angle based on the second mode angular velocity can be determined in a similar fashion. It is noted that because multiplication and division are exchangeable, the above-mentioned parameters can be calculated in different order to obtain the articulation desired angle change 666. The signal indicative of the articulation desired angle change 666 is transmitted to a product block 702 as shown in FIG. 12. Alternatively, the angular velocity for the rotation between the first frame 110 and the second frame 112 may be calculated in different ways via the movement of the articulation joystick 120. For example, the position of the articulation joystick 120 may correspond to a lookup table (not shown). Different positions of the articulation joystick 120 may correspond to different values assigned by the lookup table; each value does not have to be the percentage of travel of the articulation joystick 120. Optionally, different modes may have different lookup tables. The system can have one auto steering mode cycle time to divide the total articulation angle 640 to get the full angular velocity. The full angular velocity multiplies the values of a first mode lookup table or a second mode lookup table to obtain the angular velocity under the first or second mode. The angular velocity multiplies task rate 638 to obtain the articulation desired angle change 666. Alternatively, both total articulation angle 640 and auto steering cycle time can be replaced by the pre-set full angular velocity that multiplies the values of the first mode lookup table or the second mode lookup table to obtain the angular velocity under the first or second mode.

With continued reference to FIG. 11, after articulation desired angle change 666 is calculated, the signal indicative of the articulation desired angle change 666 is transmitted to an input of an integrator block 674. Another input of the integrator block 674 is the articulation last desired angle 678. The integrator block 674 adds the articulation desired angle change 666 and the articulation last desired angle 678 to obtain articulation desired angle 664. The signal indicative of articulation desired angle 664 will be the signal indicative of articulation desired angle 661 because the value of the auto steering activated from block 804 is TRUE, and the signal indicative of articulation desired angle 661 is transmitted to the summing operator block 660, a delay block 676, and an absolute block 672(|u|). The articulation desired angle 661 minus articulation angle 129 is calculated to obtain the auto steering articulation error 662 at the summing operator block 660 as discussed previously. The signal indicative of the articulation desired angle 661 transmitted to the delay block 676 will delay a period of time close to or equal to the task rate 638 such that the output of the delay block 676 is the signal indicative of articulation last desired angle 678, which will be transmitted to the integrator block 674 to calculate the next articulation desired angle 664.

The articulation desired angle 661 mentioned above may be used to determine whether to allow steering angle change even if the auto steering is activated (the value of the signal transmitted from Auto Steering Activated from block 804 is TRUE). One explanatory condition is provided below. However, another explanatory condition regarding to articulation angle deadband in this embodiment is omitted and the deadband concept can be the similar concept in FIG. 5. Referring to FIG. 11, the signal indicative of the articulation desired angle 661 is transmitted to the absolute block 672 (|u|). If the absolute value of the articulation desired angle 661 is smaller than the maximum articulation angle 680 (e.g. 20 degrees in this embodiment) designated in a comparison block 681, the comparison block 681 transmits a signal, the value of which is one (TRUE), indicative of Allow Steering Angle Change command 807 (represented by Allow Steering Angle Change goto block 806), which will go to the switch block 658 as shown in FIG. 12. That is, the middle input of the switch block 658 receive a value which is "one" (TRUE) from the Allow Steering Angle Change from block 808. The signal indicative of allow steering angle change 307 may be provided (TRUE) based on different conditions, such as merely above mentioned condition (smaller than maximum steering angle) can be utilized to determine whether to allow steering angle change.

The first condition mentioned above (smaller than maximum steering angle) is to prevent allowance of articulation angle change.

It is optional to have a saturator block (not shown) after the summing operator block 660 to limit the range of the auto steering articulation error 662. It is also optional to have another saturator block 686 as shown in FIG. 11 next to the integrator block 674 to limit the range of the articulation desired angle 664.

Referring to FIGS. 8 and 12, the signal indicative of the steering angle 127 may be provided by the steering angle sensor(s) 126 and transmitted to a summing operator block 704 (equivalent to the summing point 606 as shown in FIG. 9B). A signal indicative of auto-steering steering error 706 will be transmitted from the summing operator block 704 after a steering desired angle 708 minus the steering angle 127 is calculated. The signal indicative of the steering desired angle 708 is transmitted from the switch block 658. If the Allow Steering Angle Change (command) 807 is present (condition is true), the steering desire angle 708 that had been calculated and of which the signal indicative is transmitted to the top input of the switch block 658 will pass to the output as shown in FIG. 12. On the contrary, if the Allow Steering Angle Change command 807 is not present (or condition is false), the signal indicative of the steering last desired angle 714 is transmitted to the bottom input of the switch block 658 and will pass to the output (not shown); in this regard, the auto-steering steering error 706 equals to "zero" (FALSE) because the steering last desired angle 714 minus the steering angle 127 that has the same value of the steering last desired angle 714 is zero. In this regard, referring to FIGS. 11 and 12, no signal indicative of "allow steering angle change 807" is present (or the value of signal indicative of "allow steering angle change command 807 is zero/FALSE) to keep the steering angle 127 from continuing to ramp up after the articulation desired angle 661 has reached its maximum angle, which is twenty degrees in this embodiment.

The signal indicative of articulation desired angle change 666 is transmitted to a product block 702 as one input. The other input is either one of auto steering first mode steering ratio 716 or auto steering second mode steering ratio 718. In FIG. 12, since the first mode is selected as described previously, the auto steering first mode steering ratio 716 is transmitted to the product block 702. It is noted that because one of the inputs is an articulation ratio, it divides the articulation desired angle change 666 to obtain the steering desired angle change 720; alternatively, if such input is a steering ratio, the steering ratio may multiply the articulation desired angle change 666 to obtain the steering desired angle change 720. Therefore, different types of ratios stored in the memory and different types of operators are able to be used for calculating the steering desired angle change 720.

With continued reference to FIG. 12, after the steering desired angle change 720 is calculated, the signal indicative of the steering desired angle change 720 is transmitted to an input of an integrator block 722. Another input of the integrator block 722 is the steering last desired angle 714. The integrator block 722 adds the steering desired angle change 720 and the steering last desired angle 714 to obtain steering desired angle 658, the signal indicative of which is transmitted to the summing operator block 704 and a delay block 712. The steering desired angle 708 minus steering angle 127 is calculated to obtain the auto-steering steering error 706 at the summing operator block 704 as discussed previously. The signal indicative of the steering desired angle 708 is transmitted to the delay block 712 that will delay a period of time close to or equal to the task rate 638 such that the output of the delay block 712 is a signal indicative of steering last desired angle 714, which will be transmitted to the integrator block 722 to calculate the steering desired angle 708.

It is optional to have a saturator block (not shown) after the summing operator block 704 to limit the range of the auto-steering steering error 706. It is also optional to have another saturator block 724 as shown in FIG. 12 before the summing operator block 704 to limit the range of the steering desired angle 708.

From FIGS. 11 and 12, it is possible that no steering joystick needed to be involved to perform auto steering.

Figure 13A:
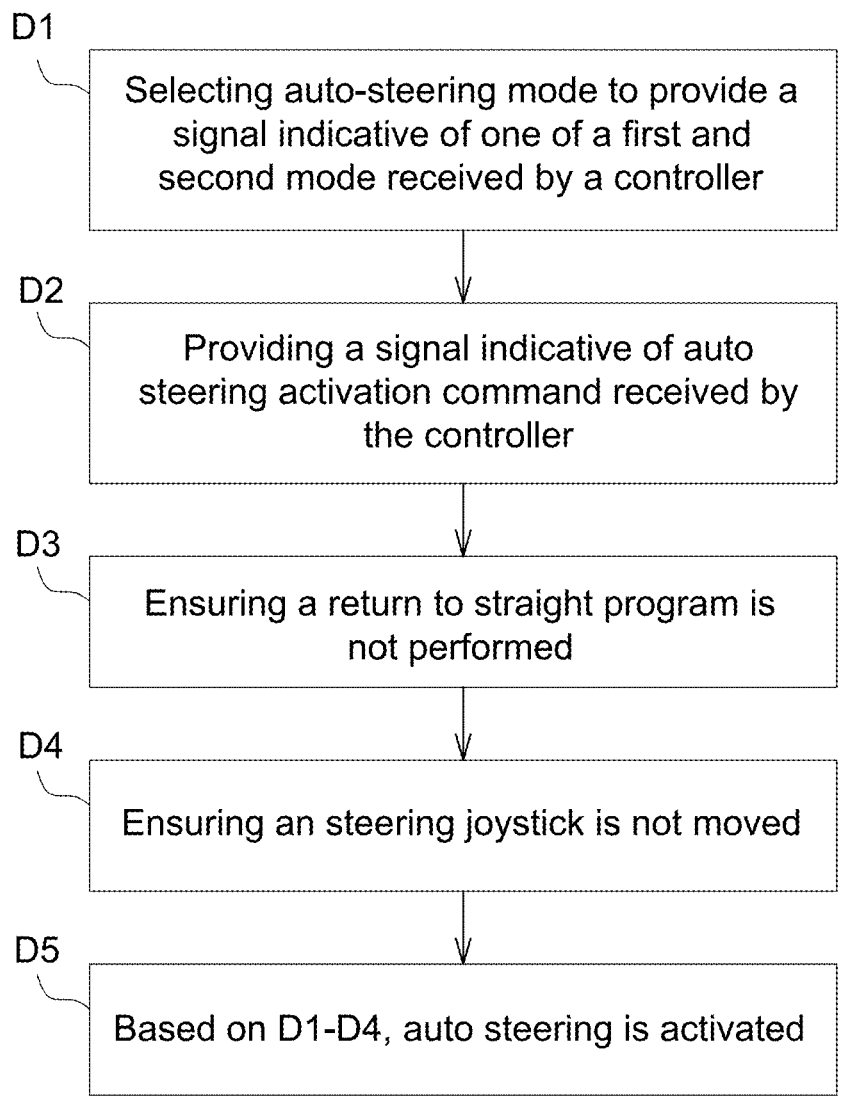
FIG. 13A is a block diagram illustrating a method for activating auto steering.

FIG. 13A illustrates a method for activating auto steering. The following steps D1-D4 could be exchanged or omitted.

D1: Selecting auto-steering mode to provide a signal indicative of one of a first and second mode received by a controller. In this embodiment, the first mode is selected (selection is not shown).

D2: Providing a signal indicative of auto steering activation command received by the controller.

D3: Ensuring a return to straight program is not performed.

D4: Ensuring a steering joystick is not moved.

D5: Based on D1-D4, auto steering is activated.

Figure 13B:
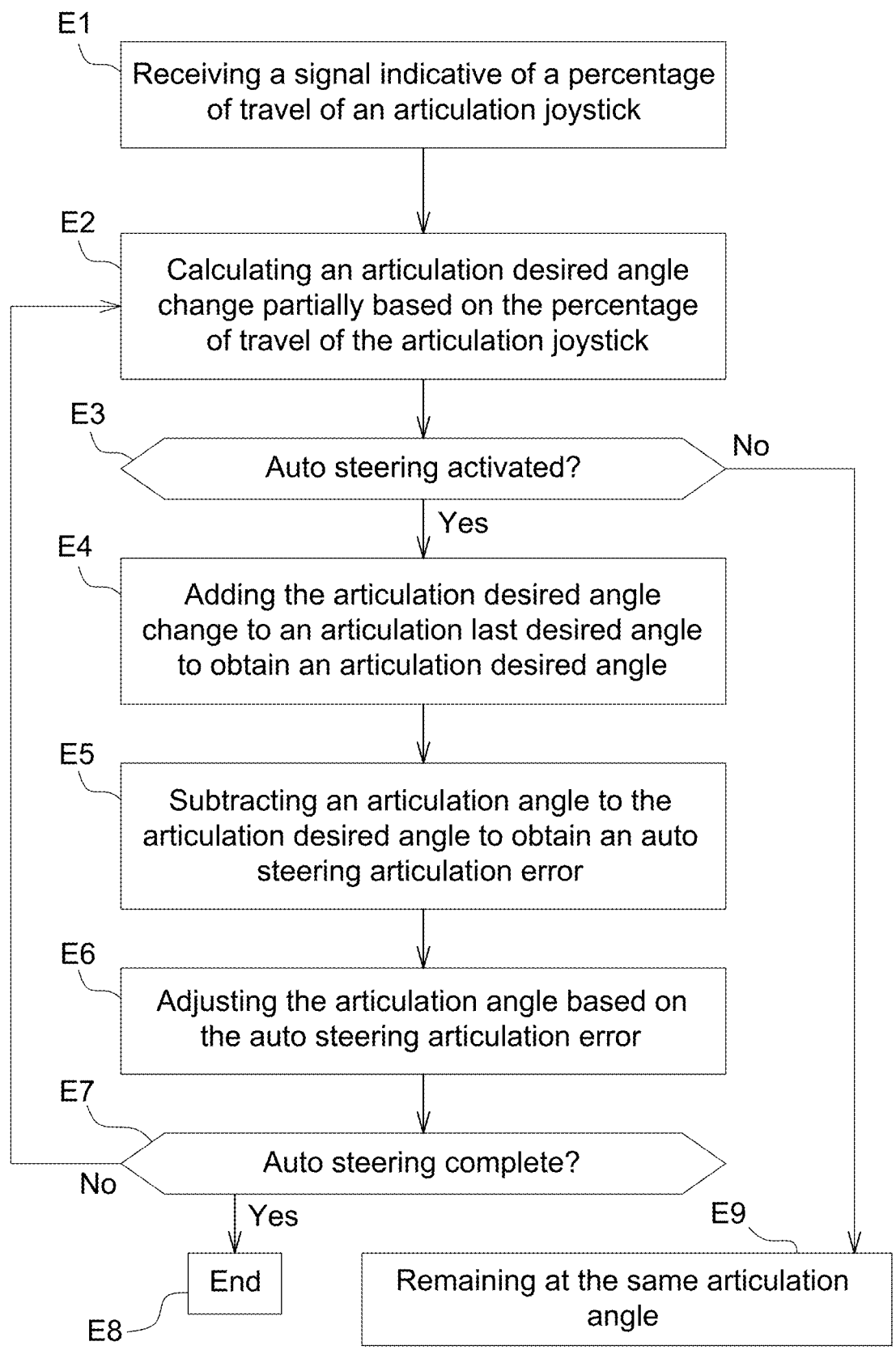
FIG. 13B is a block diagram illustrating a method for adjusting articulation angle when auto steering is operated.

FIG. 13B illustrates a method for adjusting articulation angle when auto steering is operated:

E1: Receiving a signal indicative of a percentage of travel of an articulation joystick;

E2: Calculating an articulation desired angle change partially based on the percentage of travel of the articulation joystick. To calculate the articulation desired angle change, the method may include but is not limit to the following ways:

(1) multiplying the percentage of travel of the articulation joystick, a task rate, a total articulation angle, and dividing by an auto steering cycle time that corresponds to the mode selected in Step D1. In this embodiment, the first mode is selected and therefore auto steering first mode cycle time is used to divide the multiplication of percentage of travel of the articulation joystick, task rate, total articulation angle.

(2) multiplying a value of one of the lookup tables corresponding to the percentage of travel of the articulation joystick, task rate, total articulation angle, and dividing by auto steering cycle time. The lookup tables include at least a first mode lookup table and a second mode lookup table. Since the first mode is selected, it is the first mode lookup table used for calculation.

(3) multiplying a value of one of the lookup tables corresponding to the percentage of travel of the articulation joystick, task rate, and a pre-set full angular velocity. The lookup tables include at least a first mode lookup table and a second mode lookup table. Since the first mode is selected, it is the first mode lookup table used for calculation.

E3: Determining whether the auto steering is activated. If yes, go to E4; if not, go to E9.

E4: Adding the articulation desired angle change to an articulation last desired angle to obtain an articulation desired angle. Optionally the articulation desired angle is obtained after the saturation of the sum of the articulation desired angle change and the articulation last desired angle. Optionally the articulation desired angle is calculated based on the articulation desired angle change and articulation last desired angle. It is noted that the articulation last desired angle is a previous articulation desired angle that was delayed a period of time close to or equal to the task rate.

E4 may further include comparing the absolute value of the articulation desired angle with maximum articulation angle. If the absolute value of the articulation desired angle is smaller than maximum articulation angle that one of a first frame, a second frame, and a joint between the first and second frames can turn, a signal indicative of [allow steering angle change] is provided and will be used in the method of adjusting steering angle when the auto steering is operated.

E5: Subtracting an articulation angle detected by an articulation angle sensor to the articulation desired angle to obtain an auto steering articulation error.

E6: Adjusting the articulation angle based on the auto steering articulation error.

E7: Determining whether the auto steering is complete. If yes, go to E8; if not, go to E2. There are many ways to determine whether the auto steering is complete. For example, if first mode is selected, a first mode cycle time is divided by the percentage of the travel of the articulation joystick to calculate the time is needed to complete auto steering operation. For instance, if the auto steering first mode cycle time is 10 seconds and the percentage of the travel for the articulation joystick is 50%, the auto steering needs 20 seconds to complete. Another example is to use the lookup tables mentioned in E2(2) or E2(3) that may have a corresponding time to complete auto steering at least partially based on the percentage of articulation joystick and the mode.

E8: Auto steering is complete. The calculation is end.

E9: Remaining at the same articulation angle. Because the auto steering is not activated, subtracting the articulation angle detected by an articulation angle sensor to the same articulation angle makes the auto steering articulation error zero which cannot be used to adjust articulation angle.

Figure 13C:
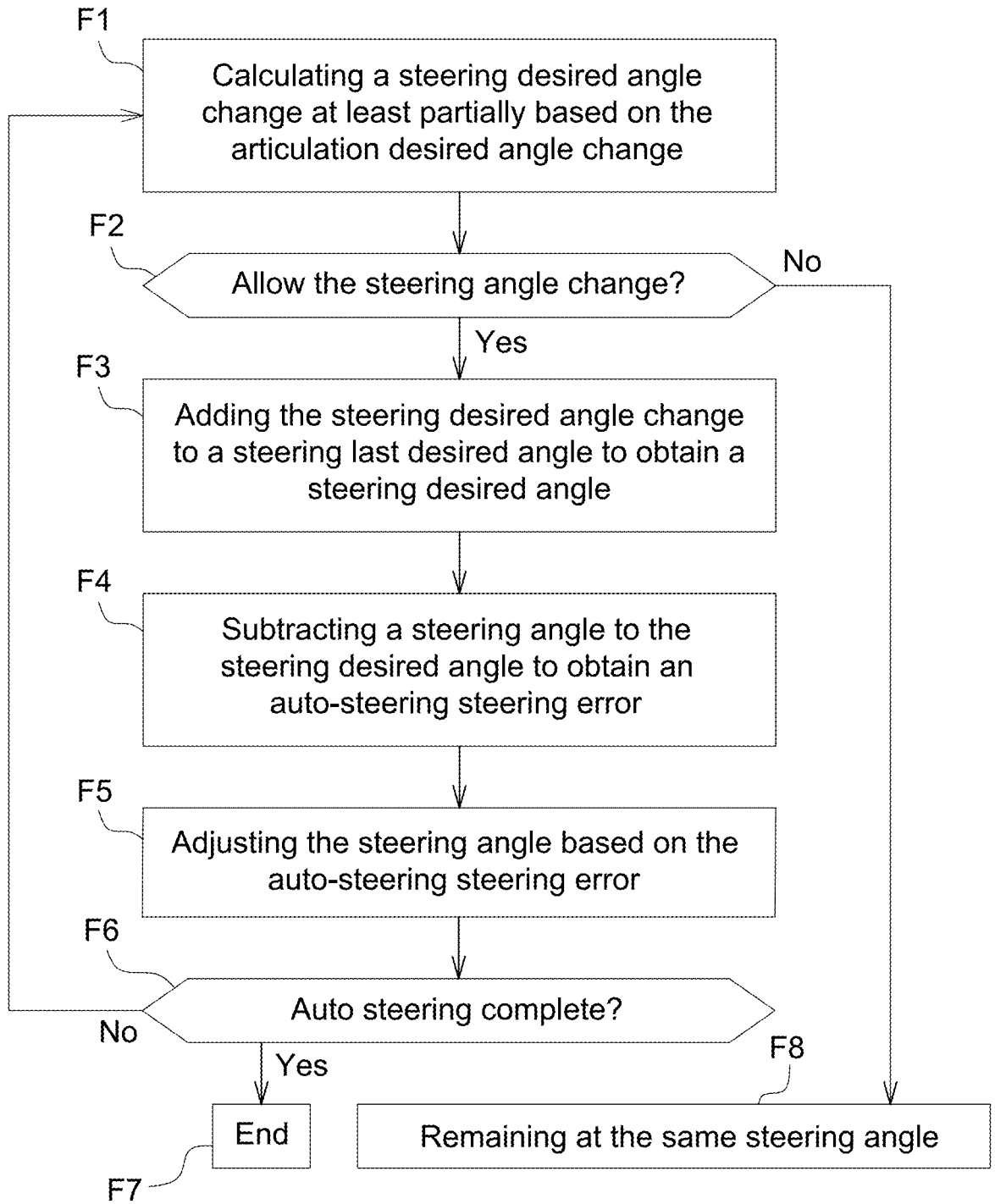
FIG. 13C is a block diagram illustrating a method for adjusting steering angle when auto steering is operated.

FIG. 13C illustrates a method for adjusting steering angle when auto steering is operated:

F1: Calculating a steering desired angle change at least partially based on the articulation desired angle change. In this embodiment, the articulation desired angle change is divided by an auto-steering articulation ratio to obtain the steering desired angle change. Auto-steering articulation ratio may include auto steering first mode articulation ratio and auto steering second mode articulation ratio. In this embodiment, since the first mode is selected, the articulation desired angle change is divided by the auto steering first mode articulation ratio to obtain the steering desired angle change. Alternatively, the articulation desired angle change multiplies by the auto-steering steering ratio (reciprocal of the auto-steering articulation ratio) to obtain the steering desired angle change.

F2: Determining whether the steering angle change is allowed [allow steering angle change]. If yes, go to F3; if no, go to F8. It is noted that there are many ways to determine whether to allow the steering angle change, which may include but is not limit to the following ways: (1) checking whether the absolute value of the articulation desired angle is smaller than the maximum articulation angle defined by the design of the vehicle; and/or (2) checking whether the absolute value of the articulation desired angle is more than an articulation angle deadband. Alternatively, another type of the deadband function can be utilized when checking whether the movement of the articulation joystick is more than a pre-set small percentage of its maximum travel distance (threshold). The deadband function in this case may be utilized when the operator/user slightly adjusts articulation angle but does not intend to allow steering angle change when auto steering is activated.

F3: Adding the steering desired angle change to a steering last desired angle to obtain a steering desired angle. Optionally the steering desired angle is obtained after the saturation of the sum of the steering desired angle change and the steering last desired angle. It is noted that the steering last desired angle is a previous steering desired angle that was delayed a period of time close to or equal to the task rate.

F4: Subtracting a steering angle detected by a steering angle sensor from the steering desired angle to obtain an auto-steering steering error.

F5: Adjusting the steering angle based on the auto-steering steering error.

F6: Determining whether the auto steering is complete. If yes, go to F7; if not, go to F1. The method for determining the completeness of the auto steering is described in step E7.

F7: Auto steering is complete. The calculation is end.

F8: Remaining at the same steering angle. Because the signal indicative of [allow steering angle change] is not present, subtracting the steering angle detected by a steering angle sensor from the steering last desired angle makes the auto-steering steering error zero which cannot be used to adjust steering angle.

As used herein, unless otherwise limited or modified, lists with elements that are separated by conjunctive terms (e.g., "and") and that are also preceded by the phrase "at least one of" or "one or more of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method for adjusting steering angle in an auto steering operation of a work vehicle, comprising:

calculating, by a controller, a steering desired angle change via an articulation desired angle change divided by the auto steering articulation ratio stored in a memory, wherein the articulation desired angle change is calculated by the controller at least based on a percentage of a travel of an articulation joystick;

adding, by the controller, the steering desired angle change to a steering last desired angle which was a previous steering desired angle;

calculating, by the controller, a difference between a steering angle detected by a steering angle sensor and the steering desired angle to obtain an auto-steering steering error; and adjusting the steering angle by a steering actuator based on the auto-steering steering error;

wherein the articulation desired angle change is at least partially based on a task rate, a total articulation angle, and an auto steering cycle time.

2. The method for adjusting steering angle in the auto steering operation of the work vehicle of claim 1, wherein the articulation desired angle change is at least partially based on an angular velocity which is a portion of a pre-set full angular velocity, and the angular velocity is at least partially determined by the percentage of the travel of the articulation joystick.

3. The method for adjusting steering angle in the auto steering operation of the work vehicle of claim 1, wherein the articulation desired angle change is calculated by multiplying the percentage of travel of the articulation joystick, the task rate, and the total articulation angle and dividing the auto steering cycle time.

4. The method for adjusting steering angle in the auto steering operation of the work vehicle of claim 1, wherein the auto steering operation includes a first mode and a second mode, and the auto steering cycle time includes an auto steering first mode cycle time corresponding to the first mode and an auto steering second mode cycle time corresponding to the second mode.

5. The method for adjusting steering angle in the auto steering operation of the work vehicle of claim 1, wherein the auto steering operation includes a first mode and a second mode, and the auto steering articulation ratio includes an auto steering first mode articulation ratio corresponding to the first mode and an auto steering second mode articulation ratio corresponding to the second mode.

6. The method for adjusting steering angle in the auto steering operation of the work vehicle of claim 1, comprising:

determining, by the controller, allowing the steering angle to change when an absolute value of an articulation desired angle which is a sum of the articulation desired angle change and a previous articulation desired angle is smaller than a maximum articulation angle of the work vehicle.

7. The method for adjusting steering angle in the auto steering operation of the work vehicle of claim 1, comprising:

determining, by the controller, allowing the steering angle to change when the absolute value of the articulation desired angle which is a sum of the articulation desired angle change and a previous articulation desired angle is more than an articulation angle deadband.

8. The method for adjusting steering angle in the auto steering operation of the work vehicle of claim 7, wherein the articulation angle deadband is less than predefined degrees.

9. The method for adjusting steering angle in the auto steering operation of the work vehicle of claim 1, comprising:

determining, by the controller, allowing the steering angle to change when the percentage of travel of the joystick is more than a pre-set threshold.

10. A method for adjusting steering angle in an auto steering operation of a work vehicle, comprising:

calculating, by a controller, a steering desired angle change via an articulation desired angle change divided by the auto steering articulation ratio stored in a memory, wherein the articulation desired angle change is calculated by the controller at least based on a percentage of a travel of an articulation joystick;

adding, by the controller, the steering desired angle change to a steering last desired angle which was a previous steering desired angle;

calculating, by the controller, a difference between a steering angle detected by a steering angle sensor and the steering desired angle to obtain an auto-steering steering error; and adjusting the steering angle by a steering actuator based on the auto-steering steering error;

wherein the auto steering operation includes a first mode and a second mode, and the auto steering articulation ratio includes an auto steering first mode articulation ratio corresponding to the first mode and an auto steering second mode articulation ratio corresponding to the second mode.

* * * * *